United States Patent
Zaman et al.

(10) Patent No.: US 9,213,468 B2
(45) Date of Patent: *Dec. 15, 2015

(54) APPLICATION REPORTING IN AN APPLICATION-SELECTABLE USER INTERFACE

(71) Applicant: Microsoft Corporation, Redmond, WA (US)

(72) Inventors: Nazia Zaman, Kirkland, WA (US); Adrian J. Garside, Sammamish, WA (US); Christopher T. Bush, Redmond, WA (US); Lindsey R. Barcheck, Seattle, WA (US); Chantal M. Leonard, Seattle, WA (US); Jesse Clay Satterfield, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,779

(22) Filed: Dec. 17, 2013

(65) Prior Publication Data
US 2014/0109008 A1    Apr. 17, 2014

Related U.S. Application Data

(63) Continuation of application No. 12/978,184, filed on Dec. 23, 2010, now Pat. No. 8,689,123.

(51) Int. Cl.
*G06F 13/00* (2006.01)
*G06F 15/00* (2006.01)
(Continued)

(52) U.S. Cl.
CPC ............ *G06F 3/0482* (2013.01); *G06Q 10/107* (2013.01); *G06Q 50/01* (2013.01); *H04L 67/26* (2013.01)

(58) Field of Classification Search
CPC ..... G06F 3/0482; H04L 67/26; G06Q 10/107
USPC ......... 715/767, 808, 751–753, 763–765, 854, 715/810, 727
See application file for complete search history.

(56) References Cited

U.S. PATENT DOCUMENTS

| 4,823,283 A | 4/1989 | Diehm et al. |
| 5,045,997 A | 9/1991 | Watanabe |

(Continued)

FOREIGN PATENT DOCUMENTS

| CN | 1326564 | 12/2001 |
| CN | 1734440 | 2/2006 |

(Continued)

OTHER PUBLICATIONS

"Final Office Action", U.S. Appl. No. 13/073,300, Apr. 1, 2014, 14 pages.

(Continued)

*Primary Examiner* — Kevin Nguyen
(74) *Attorney, Agent, or Firm* — Jim Banowsky; Kate Drakos; Micky Minhas

(57) ABSTRACT

This document describes techniques for application reporting in an application-selectable user interface. These techniques permit a user to view reports for applications in a user interface through which these applications may be selected. By so doing, a user may quickly and easily determine which applications to select based on their respective reports and then select them or their content through the user interface.

20 Claims, 11 Drawing Sheets

(51) Int. Cl.
  *G06F 3/0482* (2013.01)
  *G06Q 10/10* (2012.01)
  *G06Q 50/00* (2012.01)
  *H04L 29/08* (2006.01)

(56) References Cited

U.S. PATENT DOCUMENTS

| | | |
|---|---|---|
| 5,046,001 A | 9/1991 | Barker et al. |
| 5,189,732 A | 2/1993 | Kondo |
| 5,258,748 A | 11/1993 | Jones |
| 5,297,032 A | 3/1994 | Trojan et al. |
| 5,321,750 A | 6/1994 | Nadan |
| 5,339,392 A | 8/1994 | Risberg et al. |
| 5,432,932 A | 7/1995 | Chen et al. |
| 5,463,725 A | 10/1995 | Henckel et al. |
| 5,485,197 A | 1/1996 | Hoarty |
| 5,495,566 A | 2/1996 | Kwatinetz |
| 5,506,951 A | 4/1996 | Ishikawa |
| 5,510,808 A | 4/1996 | Cina, Jr. et al. |
| 5,515,495 A | 5/1996 | Ikemoto |
| 5,574,836 A | 11/1996 | Broemmelsiek |
| 5,598,523 A | 1/1997 | Fujita |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,675,329 A | 10/1997 | Barker |
| 5,687,331 A | 11/1997 | Volk et al. |
| 5,712,995 A | 1/1998 | Cohn |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,847,706 A | 12/1998 | Kingsley |
| 5,860,073 A | 1/1999 | Ferrel et al. |
| 5,905,492 A | 5/1999 | Straub et al. |
| 5,914,720 A | 6/1999 | Maples et al. |
| 5,940,076 A | 8/1999 | Sommers et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,163,749 A | 12/2000 | McDonough et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,313,854 B1 | 11/2001 | Gibson |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Andersone |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,784,925 B1 | 8/2004 | Tomat et al. |
| 6,798,421 B2 | 9/2004 | Baldwin |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,180,527 B2 | 2/2007 | Sakai et al. |
| 7,194,506 B1 | 3/2007 | White et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen |
| 7,283,620 B2 | 10/2007 | Adamczyk |
| 7,289,806 B2 | 10/2007 | Morris et al. |

(56) References Cited

U.S. PATENT DOCUMENTS

| | | |
|---|---|---|
| 7,296,184 B2 | 11/2007 | Derks et al. |
| 7,296,242 B2 | 11/2007 | Agata et al. |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,409,646 B2 | 8/2008 | Vedbrat et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,106 B2 | 10/2009 | Ernst et al. |
| 7,610,563 B2 | 10/2009 | Nelson et al. |
| 7,619,615 B1 | 11/2009 | Donoghue |
| 7,640,518 B2 | 12/2009 | Forlines et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,694,221 B2 | 4/2010 | Fortes |
| 7,702,683 B1 | 4/2010 | Kirshenbaum |
| 7,755,674 B2 | 7/2010 | Kaminaga |
| 7,792,925 B1 | 9/2010 | Werner et al. |
| 7,834,861 B2 | 11/2010 | Lee |
| 7,844,915 B2 | 11/2010 | Platzer et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,903,115 B2 | 3/2011 | Platzer et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,028,239 B1 | 9/2011 | Al-Hilali et al. |
| 8,065,628 B2 | 11/2011 | Oshiro et al. |
| 8,086,275 B2 | 12/2011 | Wykes |
| 8,108,781 B2 | 1/2012 | Laansoo et al. |
| 8,131,808 B2 | 3/2012 | Aoki et al. |
| 8,150,924 B2 | 4/2012 | Buchheit et al. |
| 8,171,431 B2 | 5/2012 | Grossman et al. |
| 8,175,653 B2 | 5/2012 | Smuga |
| 8,176,438 B2 | 5/2012 | Zaman et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,250,494 B2 | 8/2012 | Butcher |
| 8,255,473 B2 | 8/2012 | Eren et al. |
| 8,255,812 B1 * | 8/2012 | Parparita et al. ............... 715/762 |
| 8,269,736 B2 | 9/2012 | Wilairat |
| 8,279,241 B2 | 10/2012 | Fong |
| 8,307,279 B1 | 11/2012 | Fioravanti et al. |
| 8,384,726 B1 | 2/2013 | Grabowski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,493,510 B2 | 7/2013 | Bryan et al. |
| 8,525,808 B1 | 9/2013 | Buening |
| 8,539,384 B2 | 9/2013 | Hinckley et al. |
| 8,548,431 B2 | 10/2013 | Teng et al. |
| 8,560,959 B2 | 10/2013 | Zaman et al. |
| 8,589,815 B2 | 11/2013 | Fong et al. |
| 8,612,874 B2 | 12/2013 | Zaman et al. |
| 8,627,227 B2 | 1/2014 | Matthews et al. |
| 8,665,272 B2 | 3/2014 | Fitzmaurice et al. |
| 8,669,950 B2 | 3/2014 | Forstall et al. |
| 8,687,023 B2 | 4/2014 | Markiewicz et al. |
| 8,689,123 B2 | 4/2014 | Zaman et al. |
| 8,706,515 B2 | 4/2014 | Cobbs et al. |
| 8,830,270 B2 | 9/2014 | Zaman et al. |
| 8,893,033 B2 | 11/2014 | Donahue et al. |
| 8,922,575 B2 | 12/2014 | Garside et al. |
| 8,933,952 B2 | 1/2015 | Zaman et al. |
| 8,935,631 B2 | 1/2015 | Leonard et al. |
| 8,990,733 B2 | 3/2015 | Deutsch et al. |
| 9,015,606 B2 | 4/2015 | Zaman et al. |
| 9,052,820 B2 | 6/2015 | Jarrett et al. |
| 9,104,307 B2 | 8/2015 | Jarrett et al. |
| 9,104,440 B2 | 8/2015 | Jarrett et al. |
| 9,146,670 B2 | 9/2015 | Zaman et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0026524 A1 | 2/2002 | Dharap |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0083025 A1 | 6/2002 | Robarts et al. |
| 2002/0091755 A1 | 7/2002 | Narin |
| 2002/0097264 A1 | 7/2002 | Dutta et al. |
| 2002/0105531 A1 | 8/2002 | Niemi |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0149622 A1 | 10/2002 | Uesaki et al. |
| 2002/0152305 A1 | 10/2002 | Jackson et al. |
| 2002/0154176 A1 | 10/2002 | Barksdale et al. |
| 2002/0161634 A1 | 10/2002 | Kaars |
| 2002/0165923 A1 | 11/2002 | Prince |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0052900 A1 | 3/2003 | Card et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2004/0066414 A1 | 4/2004 | Czerwinski et al. |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0155908 A1 | 8/2004 | Wagner |

(56) References Cited

U.S. PATENT DOCUMENTS

| | | |
|---|---|---|
| 2004/0185883 A1 | 9/2004 | Rukman |
| 2004/0212586 A1 | 10/2004 | Denny |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0250217 A1 | 12/2004 | Tojo et al. |
| 2004/0266491 A1 | 12/2004 | Howard et al. |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0054384 A1 | 3/2005 | Pasquale et al. |
| 2005/0058353 A1 | 3/2005 | Matsubara |
| 2005/0060647 A1 | 3/2005 | Doan et al. |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0081155 A1 | 4/2005 | Martin et al. |
| 2005/0085215 A1 | 4/2005 | Kokko |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125736 A1 | 6/2005 | Ferri et al. |
| 2005/0143138 A1 | 6/2005 | Lee et al. |
| 2005/0149879 A1 | 7/2005 | Jobs et al. |
| 2005/0156947 A1 | 7/2005 | Sakai et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0268237 A1 | 12/2005 | Crane et al. |
| 2005/0273614 A1 | 12/2005 | Ahuja |
| 2005/0280719 A1 | 12/2005 | Kim |
| 2006/0004685 A1 | 1/2006 | Pyhalammi et al. |
| 2006/0010394 A1 | 1/2006 | Chaudhri et al. |
| 2006/0015736 A1 | 1/2006 | Callas et al. |
| 2006/0015812 A1 | 1/2006 | Cunningham |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0061597 A1 | 3/2006 | Hui |
| 2006/0070005 A1 | 3/2006 | Gilbert et al. |
| 2006/0074735 A1 | 4/2006 | Shukla et al. |
| 2006/0074771 A1 | 4/2006 | Kim |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156228 A1 | 7/2006 | Gallo et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0227153 A1 | 10/2006 | Anwar et al. |
| 2006/0236264 A1 | 10/2006 | Cain et al. |
| 2006/0246955 A1 | 11/2006 | Nirhamo |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman |
| 2007/0005716 A1 | 1/2007 | LaVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0028267 A1 | 2/2007 | Ostojic et al. |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0055770 A1 | 3/2007 | Karmakar et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094045 A1 | 4/2007 | Cobbs et al. |
| 2007/0106635 A1 | 5/2007 | Frieden et al. |
| 2007/0120835 A1 | 5/2007 | Sato |
| 2007/0127638 A1 | 6/2007 | Doulton |
| 2007/0143705 A1 | 6/2007 | Peters |
| 2007/0157089 A1 | 7/2007 | Van Os et al. |
| 2007/0157105 A1 | 7/2007 | Owens et al. |
| 2007/0171192 A1 | 7/2007 | Seo et al. |
| 2007/0180381 A1 | 8/2007 | Rice |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192726 A1 | 8/2007 | Kim et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214429 A1 | 9/2007 | Lyudovyk et al. |
| 2007/0216651 A1 | 9/2007 | Patel |
| 2007/0216661 A1 | 9/2007 | Chen et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |

(56) References Cited

U.S. PATENT DOCUMENTS

| | | |
|---|---|---|
| 2008/0005668 A1 | 1/2008 | Mavinkurve |
| 2008/0028294 A1 | 1/2008 | Sell et al. |
| 2008/0032681 A1 | 2/2008 | West |
| 2008/0036743 A1 | 2/2008 | Westerman |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0065607 A1 | 3/2008 | Weber |
| 2008/0072173 A1 | 3/2008 | Brunner et al. |
| 2008/0076472 A1 | 3/2008 | Hyatt |
| 2008/0082911 A1 | 4/2008 | Sorotokin et al. |
| 2008/0082934 A1 | 4/2008 | Kocienda et al. |
| 2008/0085700 A1 | 4/2008 | Arora |
| 2008/0092054 A1 | 4/2008 | Bhumkar et al. |
| 2008/0094368 A1 | 4/2008 | Ording et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0122796 A1 | 5/2008 | Jobs |
| 2008/0132252 A1 | 6/2008 | Altman et al. |
| 2008/0138030 A1 | 6/2008 | Bryan et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0158189 A1 | 7/2008 | Kim |
| 2008/0162651 A1 | 7/2008 | Madnani |
| 2008/0163104 A1 | 7/2008 | Haug |
| 2008/0165132 A1 | 7/2008 | Weiss |
| 2008/0165136 A1 | 7/2008 | Christie et al. |
| 2008/0165141 A1 | 7/2008 | Christie |
| 2008/0165163 A1 | 7/2008 | Bathiche |
| 2008/0165210 A1 | 7/2008 | Platzer et al. |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Adbel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0225014 A1 | 9/2008 | Kim |
| 2008/0242362 A1 | 10/2008 | Duarte |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0284798 A1 | 11/2008 | Weybrew et al. |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0309626 A1 | 12/2008 | Westerman et al. |
| 2008/0313540 A1 | 12/2008 | Dirks et al. |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031243 A1 | 1/2009 | Kano et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058821 A1 | 3/2009 | Chaudhri |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0079740 A1 | 3/2009 | Fitzmaurice et al. |
| 2009/0083656 A1 | 3/2009 | Dokhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0089704 A1 | 4/2009 | Makela |
| 2009/0094562 A1 | 4/2009 | Jeong et al. |
| 2009/0103515 A1 | 4/2009 | Pointer |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |
| 2009/0144642 A1 | 6/2009 | Crystal |
| 2009/0144652 A1 | 6/2009 | Wiley |
| 2009/0144653 A1 | 6/2009 | Ubillos |
| 2009/0144753 A1 | 6/2009 | Morris |
| 2009/0146962 A1 | 6/2009 | Ahonen et al. |
| 2009/0150618 A1 | 6/2009 | Allen, Jr. et al. |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0171920 A1 | 7/2009 | Wade et al. |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0189868 A1 | 7/2009 | Joo et al. |
| 2009/0192942 A1 | 7/2009 | Cottrille et al. |
| 2009/0193358 A1 | 7/2009 | Mernyk et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0225038 A1 | 9/2009 | Bolsinga et al. |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0284657 A1 | 11/2009 | Roberts et al. |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293013 A1 | 11/2009 | O'Shaugnessy et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |

(56) References Cited

U.S. PATENT DOCUMENTS

| | | |
|---|---|---|
| 2009/0315847 A1 | 12/2009 | Fujii |
| 2009/0318171 A1 | 12/2009 | Backholm et al. |
| 2009/0322760 A1 | 12/2009 | Kwiatkowski |
| 2009/0327969 A1 | 12/2009 | Estrada |
| 2010/0008490 A1 | 1/2010 | Gharachorloo et al. |
| 2010/0010934 A1 | 1/2010 | Barry et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0057566 A1 | 3/2010 | Itzhak |
| 2010/0058248 A1 | 3/2010 | Park |
| 2010/0062811 A1 | 3/2010 | Park et al. |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0088641 A1 | 4/2010 | Choi |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0123737 A1 | 5/2010 | Williamson et al. |
| 2010/0131901 A1 | 5/2010 | Takahashi et al. |
| 2010/0138767 A1 | 6/2010 | Wang et al. |
| 2010/0145675 A1 | 6/2010 | Lloyd et al. |
| 2010/0146384 A1 | 6/2010 | Peev et al. |
| 2010/0146437 A1 | 6/2010 | Woodcock et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0169819 A1 | 7/2010 | Bestle et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0216491 A1 | 8/2010 | Winkler et al. |
| 2010/0223569 A1 | 9/2010 | Vuong et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0251167 A1 | 9/2010 | Deluca et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295795 A1 | 11/2010 | Wilairat |
| 2010/0298034 A1 | 11/2010 | Shin et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Wilairat |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0328431 A1 | 12/2010 | Kim et al. |
| 2010/0329642 A1 | 12/2010 | Kam et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0032365 A1 | 2/2011 | Yett |
| 2011/0035702 A1 | 2/2011 | Williams et al. |
| 2011/0043527 A1 | 2/2011 | Ording et al. |
| 2011/0055773 A1 | 3/2011 | Agarawala et al. |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0087988 A1 | 4/2011 | Ray et al. |
| 2011/0093778 A1 | 4/2011 | Kim et al. |
| 2011/0093815 A1 | 4/2011 | Gobeil |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0138313 A1 | 6/2011 | Decker et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167403 A1 | 7/2011 | French et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0181617 A1 | 7/2011 | Tsuda et al. |
| 2011/0202837 A1 | 8/2011 | Fong et al. |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0258563 A1 | 10/2011 | Lincke |
| 2011/0276864 A1 | 11/2011 | Oules |
| 2011/0283188 A1 | 11/2011 | Farrenkopf et al. |
| 2011/0316884 A1 | 12/2011 | Giambalvo et al. |
| 2012/0005584 A1 | 1/2012 | Seago et al. |
| 2012/0009903 A1 | 1/2012 | Schultz et al. |
| 2012/0017162 A1 | 1/2012 | Khokhlov |
| 2012/0028687 A1 | 2/2012 | Wykes |
| 2012/0050185 A1 | 3/2012 | Davydov et al. |
| 2012/0050332 A1 | 3/2012 | Nikara et al. |
| 2012/0081310 A1 | 4/2012 | Schrock |
| 2012/0089950 A1 | 4/2012 | Tseng |
| 2012/0102433 A1 | 4/2012 | Falkenburg |
| 2012/0151397 A1 | 6/2012 | Oberstein et al. |
| 2012/0159395 A1 | 6/2012 | Deutsch et al. |

(56) References Cited

U.S. PATENT DOCUMENTS

| | | | |
|---|---|---|---|
| 2012/0159402 | A1 | 6/2012 | Nurmi et al. |
| 2012/0162266 | A1 | 6/2012 | Douglas et al. |
| 2012/0167008 | A1 | 6/2012 | Zaman |
| 2012/0167011 | A1 | 6/2012 | Zaman |
| 2012/0169593 | A1 | 7/2012 | Mak et al. |
| 2012/0174005 | A1 | 7/2012 | Deutsch |
| 2012/0174029 | A1 | 7/2012 | Bastide et al. |
| 2012/0174034 | A1 | 7/2012 | Chae et al. |
| 2012/0176401 | A1 | 7/2012 | Hayward et al. |
| 2012/0179992 | A1 | 7/2012 | Smuga |
| 2012/0210265 | A1 | 8/2012 | Delia et al. |
| 2012/0212495 | A1 | 8/2012 | Butcher |
| 2012/0216139 | A1 | 8/2012 | Ording et al. |
| 2012/0226971 | A1 | 9/2012 | Tocchini et al. |
| 2012/0233571 | A1 | 9/2012 | Wever et al. |
| 2012/0244841 | A1 | 9/2012 | Teng |
| 2012/0254780 | A1 | 10/2012 | Mouton et al. |
| 2012/0265644 | A1 | 10/2012 | Roa et al. |
| 2012/0290962 | A1 | 11/2012 | Zielinski et al. |
| 2012/0299968 | A1 | 11/2012 | Wong et al. |
| 2012/0304068 | A1 | 11/2012 | Zaman et al. |
| 2012/0304092 | A1 | 11/2012 | Jarrett et al. |
| 2012/0304108 | A1 | 11/2012 | Jarrett et al. |
| 2012/0304113 | A1 | 11/2012 | Patten et al. |
| 2012/0304114 | A1 | 11/2012 | Wong et al. |
| 2012/0304116 | A1 | 11/2012 | Donahue et al. |
| 2012/0304117 | A1 | 11/2012 | Donahue et al. |
| 2012/0304118 | A1 | 11/2012 | Donahue et al. |
| 2012/0311485 | A1 | 12/2012 | Caliendo, Jr. et al. |
| 2012/0323992 | A1 | 12/2012 | Brobst et al. |
| 2013/0031508 | A1 | 1/2013 | Kodosky et al. |
| 2013/0033525 | A1 | 2/2013 | Markiewicz |
| 2013/0042203 | A1 | 2/2013 | Wong et al. |
| 2013/0042206 | A1 | 2/2013 | Zaman et al. |
| 2013/0044141 | A1 | 2/2013 | Markiewicz |
| 2013/0047079 | A1 | 2/2013 | Kroeger et al. |
| 2013/0047105 | A1 | 2/2013 | Jarrett |
| 2013/0047117 | A1 | 2/2013 | Deutsch |
| 2013/0057587 | A1 | 3/2013 | Leonard et al. |
| 2013/0057588 | A1 | 3/2013 | Leonard |
| 2013/0063442 | A1 | 3/2013 | Zaman |
| 2013/0063443 | A1 | 3/2013 | Garside |
| 2013/0063465 | A1 | 3/2013 | Zaman |
| 2013/0063490 | A1 | 3/2013 | Zaman |
| 2013/0067381 | A1 | 3/2013 | Yalovsky |
| 2013/0067390 | A1 | 3/2013 | Kwiatkowski |
| 2013/0067391 | A1 | 3/2013 | Pittappilly |
| 2013/0067398 | A1 | 3/2013 | Pittappilly |
| 2013/0067399 | A1 | 3/2013 | Elliott |
| 2013/0067412 | A1 | 3/2013 | Leonard |
| 2013/0067420 | A1 | 3/2013 | Pittappilly |
| 2013/0093757 | A1 | 4/2013 | Cornell |
| 2014/0033099 | A1 | 1/2014 | Treitman et al. |
| 2014/0082552 | A1 | 3/2014 | Zaman |
| 2014/0098108 | A1 | 4/2014 | Fong et al. |
| 2014/0359721 | A1 | 12/2014 | Alphin et al. |
| 2015/0046829 | A1 | 2/2015 | Donahue et al. |
| 2015/0058763 | A1 | 2/2015 | Leonard et al. |
| 2015/0113476 | A1 | 4/2015 | Deutsch et al. |
| 2015/0186376 | A1 | 7/2015 | Garside et al. |
| 2015/0193403 | A1 | 7/2015 | Zaman et al. |

FOREIGN PATENT DOCUMENTS

| | | |
|---|---|---|
| CN | 1902575 | 1/2007 |
| CN | 1904823 | 1/2007 |
| CN | 1930568 | 3/2007 |
| CN | 101036104 | 9/2007 |
| CN | 101114303 | 1/2008 |
| CN | 101578577 | 11/2009 |
| CN | 101809531 | 8/2010 |
| CN | 102004603 | 4/2011 |
| CN | 102033710 | 4/2011 |
| CN | 102144213 | 8/2011 |
| CN | 102197702 | 9/2011 |
| CN | 102460370 | 5/2012 |
| EP | 0583060 | 2/1994 |
| EP | 1752868 | 2/2007 |
| EP | 1939718 | 7/2008 |
| EP | 2172836 | 4/2009 |
| EP | 2262193 | 12/2010 |
| GB | 2350991 | 12/2000 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009012398 | 1/2009 |
| WO | WO-2009049331 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010119356 | 10/2010 |
| WO | WO-2010125451 | 11/2010 |
| WO | WO-2010135155 | 11/2010 |
| WO | WO-2011041885 | 4/2011 |

OTHER PUBLICATIONS

"Foreign Office Action", CN Application No. 201110429183.5, Jan. 6, 2014, 10 Pages.

"Foreign Office Action", CN Application No. 201110437542.1, Jan. 6, 2014, 10 Pages.

"Foreign Office Action", CN Application No. 201110437572.2, Dec. 3, 2013, 7 pages.

"Foreign Office Action", CN Application No. 201110454251.3, Dec. 27, 2013, 12 Pages.

"International Search Report and Written Opinion", Application No. PCT/US2013/061066, Feb. 4, 2014, 17 pages.

"Non-Final Office Action", U.S. Appl. No. 13/228,888, Feb. 10, 2014, 21 pages.

"Non-Final Office Action", U.S. Appl. No. 13/229,556, Mar. 28, 2014, 12 pages.

"Restriction Requirement", U.S. Appl. No. 13/118,265, Feb. 27, 2014, 7 pages.

"Restriction Requirement", U.S. Appl. No. 13/118,288, Mar. 4, 2014, 7 pages.

"Supplemental Notice of Allowance", U.S. Appl. No. 12/978,184, Feb. 25, 2014, 2 pages.

"Final Office Action", U.S. Appl. No. 13/345,383, Jul. 25, 2014, 26 pages.

"Foreign Office Action", CN Application No. 201110429183.5, Aug. 21, 2014, 13 Pages.

(56) References Cited

OTHER PUBLICATIONS

"Foreign Office Action", CN Application No. 201210317470.1, Jun. 5, 2014, 12 pages.
"Foreign Office Action", CN Application No. 201210331686.3, Jun. 13, 2014, 13 pages.
"Non-Final Office Action", U.S. Appl. No. 12/983,106, Sep. 10, 2014, 19 pages.
"Notice of Allowance", U.S. Appl. No. 13/229,556, Sep. 2, 2014, 12 pages.
"Notice of Allowance", U.S. Appl. No. 13/229,709, Sep. 2, 2014, 4 pages.
"Notice of Allowance", U.S. Appl. No. 13/656,574, Sep. 23, 2014, 7 pages.
"Supplemental Notice of Allowance", U.S. Appl. No. 13/118,204, Sep. 10, 2014, 2 pages.
"Final Office Action", U.S. Appl. No. 13/118,333, Apr. 23, 2014, 22 pages.
"Final Office Action", U.S. Appl. No. 13/228,707, May 21, 2014, 16 pages.
"Final Office Action", U.S. Appl. No. 13/229,155, Jun. 12, 2014, 15 pages.
"Gestures Programming", Retrieved from <http://doc.qt.digia.com/4.6/gestures-overview.html> on May 28, 2014, 2010, 3 pages.
"Image Gestures Example", Retrieved from <http://doc.qt.digia.com/4.6/gestures-imagegestures.html> on May 28, 2014, 2010, 3 pages.
"Non-Final Office Action", U.S. Appl. No. 13/118,265, Jun. 10, 2014, 13 pages.
"Non-Final Office Action", U.S. Appl. No. 13/118,292, Jun. 6, 2014, 25 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,709, Apr. 7, 2014, 12 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 13/655,386, Apr. 25, 2014, 6 pages.
"QPinchGesture Class Reference", Retrieved from <http://doc.qt.digia.com/4.6/qpinchgesture.html> on May 28, 2014, 2010, 6 pages.
Anson, "Pining for Windows Phone 7 controls? We got ya covered! [Announcing the first release of the Silverlight for Windows Phone Toolkit!]", Retrieved from <http://blogs.msdn.com/b/delay/archive/2010/09/16/pining-for-windows-phone-7-controls-we-got-ya-covered-announcing-the-first-release-of-the-silverlight-for-windows-phone-toolkit.aspx> on May 30, 2014, Sep. 16, 2010, 17 pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"Blackberry office tools: Qwerty Convert", Retrieved from: <http://blackberrysoftwarelist.net/blackberry/download-software/blackberry-office/qwerty_convert.aspx> on Nov. 20, 2008, 1 page.
"Dial a number", Retrieved from: <http://www.phonespell.org/ialhelp.html> on Nov. 20, 2008, 1 page.
"Non-Final Office Action", U.S. Appl. No. 13/196,272, Feb. 6, 2013, 10 pages.
"Non-Final Office Action", U.S. Appl. No. 13/656,354, Feb. 6, 2013, 10 pages.
"Final Office Action", U.S. Appl. No. 11/305,789, Apr. 1, 2009, 10 pages.
"PCT Search Report and Written Opinion", Application No. PCT/US2010/028555, Oct. 12, 2010, 10 pages.
"Notice of Allowance", U.S. Appl. No. 12/484,799, Oct. 22, 2012, 10 pages.
"PCT Search Report and Written Opinion", Application No. PCT/US2010/028699, Oct. 4, 2010, 10 pages.
"PCT Search Report and Written Opinion", Application No. PCT/US2011/067075, Dec. 12, 2012, 10 pages.
"moGo beta v.0.4", Retrieved from: <http://forum.xda-developers.com/showthread.php?t=375196> on Sep. 27, 2010, Mar. 7, 2008, 10 pages.
"Final Office Action", U.S. Appl. No. 12/721,422, Mar. 7, 2013, 10 pages.
"PCT Search Report", Application Serial No. PCT/US2009/061864, May 14, 2010, 10 pages.
"PCT Search Report and Written Opinion", Application No. PCT/US2009/061382, May 26, 2010, 10 pages.
"HTC Shows HTC Snap with Snappy Email Feature", Retrieved from: <http://www.wirelessandmobilenews.com/smartphones/ on May 5, 2009>, May 4, 2009, 10 Pages.
"Non-Final Office Action", U.S. Appl. No. 12/433,605, Jun. 24, 2011, 10 pages.
"PCT Search Report and Written Opinion", Application No. PCT/US2011/055725, Sep. 27, 2012, 10 pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"GnomeCanvas", Retrieved from: <http://library.gnome.org/devel/libgnomecanvas/unstable/GnomeCanvas.html> on Sep. 28, 2010, 11 pages.
"Final Office Action", U.S. Appl. No. 12/433,605, Feb. 3, 2012, 11 pages.
"PCT Search Report and Written Opinion", Application No. PCT/US2009/061735, Jun. 7, 2010, 11 pages.
"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"Non-Final Office Action", U.S. Appl. No. 13/228,707, Oct. 25, 2013, 12 pages.
"Non-Final Office Action", U.S. Appl. No. 13/655,390, Dec. 17, 2012, 12 pages.
"PCT Search Report and Written Opinion", Application No. PCT/US2010/034772, Dec. 29, 2010, 12 pages.
"Final Office Action", U.S. Appl. No. 13/657,646, May 6, 2013, 12 pages.
"Non-Final Office Action", U.S. Appl. No. 12/484,799, Aug. 11, 2011, 12 pages.
"Class ScrollView", Retrieved from: <http://www.blackberry.com/developers/docs/6.0.0api/net/rim/device/api/ui/ScrollView.html> on Sep. 28, 2010, 13 pages.
"Non-Final Office Action", U.S. Appl. No. 13/118,204, Feb. 28, 2013, 13 pages.
"Non-Final Office Action", U.S. Appl. No. 13/657,646, Jan. 3, 2013, 13 pages.
"Final Office Action", U.S. Appl. No. 12/484,799, Apr. 30, 2012, 13 pages.
"Non-Final Office Action", U.S. Appl. No. 12/469,419, May 23, 2012, 13 pages.
"Non-Final Office Action", U.S. Appl. No. 13/073,300, Jul. 25, 2013, 13 pages.
"Non-Final Office Action", U.S. Appl. No. 12/484,799, Aug. 7, 2012, 13 pages.
"Non-Final Office Action", U.S. Appl. No. 13/118,347, Feb. 12, 2013, 14 pages.
"Final Office Action", U.S. Appl. No. 13/656,354, Jun. 17, 2013, 14 pages.
"Non-Final Office Action", U.S. Appl. No. 13/229,155, Nov. 18, 2013, 14 pages.
"Non-Final Office Action", U.S. Appl. No. 13/228,876, Nov. 22, 2013, 14 pages.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.

(56) References Cited

OTHER PUBLICATIONS

"Non-Final Office Action", U.S. Appl. No. 11/502,264, Sep. 14, 2012, 14 pages.
"Non-Final Office Action", U.S. Appl. No. 12/469,458, Sep. 21, 2012, 14 pages.
"Non-Final Office Action", U.S. Appl. No. 12/469,480, Sep. 22, 2011, 14 pages.
"Final Office Action", U.S. Appl. No. 11/502,264, Feb. 4, 2010, 15 pages.
"Non-Final Office Action", U.S. Appl. No. 13/118,339, Feb. 11, 2013, 15 pages.
"Non-Final Office Action", U.S. Appl. No. 12/433,667, Jun. 7, 2011, 15 pages.
"Non-Final Office Action", U.S. Appl. No. 11/502,264, Sep. 30, 2009, 15 pages.
"Non-Final Office Action", U.S. Appl. No. 12/469,419, Nov. 9, 2011, 15 pages.
"Final Office Action", U.S. Appl. No. 12/469,458, Nov. 17, 2011, 15 pages.
"PCT Search Report and Written Opinion", Application No. PCT/US2012/047091, Dec. 27, 2012, 15 pages.
"Non-Final Office Action", U.S. Appl. No. 12/469,458, Jul. 1, 2011, 15 pages.
"Non-Final Office Action", U.S. Appl. No. 12/244,545, Aug. 17, 2011, 15 pages.
"Non-Final Office Action", U.S. Appl. No. 12/480,969, Aug. 7, 2012, 15 pages.
"Final Office Action", U.S. Appl. No. 11/502,264, Mar. 29, 2013, 16 pages.
"Non-Final Office Action", U.S. Appl. No. 12/469,480, Oct. 17, 2012, 16 pages.
"Final Office Action", U.S. Appl. No. 12/413,977, Nov. 17, 2011, 16 pages.
"Final Office Action", U.S. Appl. No. 12/244,545, Dec. 7, 2011, 16 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/433,667, Feb. 3, 2012, 16 pages.
"Final Office Action", U.S. Appl. No. 12/560,081, Mar. 14, 2012, 16 pages.
"Non-Final Office Action", U.S. Appl. No. 12/413,977, Jul. 19, 2011, 17 pages.
"Non-Final Office Action", U.S. Appl. No. 12/983,106, Nov. 9, 2012, 17 pages.
"Final Office Action", U.S. Appl. No. 12/469,480, Feb. 9, 2012, 17 pages.
"Non-Final Office Action", U.S. Appl. No. 11/215,052, Jun. 23, 2011, 17 pages.
"Final Office Action", U.S. Appl. No. 12/433,667, Sep. 13, 2011, 17 pages.
"Non-Final Office Action", U.S. Appl. No. 13/118,333, Jul. 5, 2013, 18 pages.
"Final Office Action", U.S. Appl. No. 13/657,621, Sep. 10, 2013, 18 pages.
"Non-Final Office Action", U.S. Appl. No. 12/244,545, Mar. 27, 2012, 18 pages.
"Non-Final Office Action", U.S. Appl. No. 12/413,977, Jul. 20, 2012, 18 pages.
"Non-Final Office Action", U.S. Appl. No. 12/972,967, Jan. 30, 2013, 19 pages.
"Non-Final Office Action", U.S. Appl. No. 13/657,621, Feb. 7, 2013, 19 pages.
"Non-Final Office Action", U.S. Appl. No. 13/118,257, Mar. 5, 2013, 19 pages.
"Final Office Action", U.S. Appl. No. 12/983,106, Oct. 7, 2013, 19 pages.
"Supplemental Notice of Allowance", U.S. Appl. No. 12/977,584, Sep. 16, 2013, 2 pages.
"Supplemental Notice of Allowance", U.S. Appl. No. 13/655,390, Sep. 19, 2013, 2 pages.
"Supplemental Notice of Allowance", U.S. Appl. No. 12/977,584, Oct. 11, 2013, 2 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"Supplemental Notice of Allowance", U.S. Appl. No. 13/655,390, Jul. 25, 2013, 2 pages.
"Notice of Allowance", U.S. Appl. No. 12/470,558, Aug. 23, 2012, 2 pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Touch Shell Free", Retrieved from: <http://www.pocketpcfreeware.mobi/download-touch-shell-free.html> on May 5, 2009., Feb. 23, 2009, 2 Pages.
"Palette Extender 1.0.2", Retrieved from: <http://palette-extender.en.softonic.com/symbian> on Nov. 6, 2008, Jan. 21, 2003, 2 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Freeware.mobi", Retrieved from: <http://www.palmfreeware.mobi/download-palette.html> on Nov. 6, 2008, Oct. 9, 2001, 2 pages.
"Final Office Action", U.S. Appl. No. 13/656,574, Aug. 23, 2013, 20 pages.
"Final Office Action", U.S. Appl. No. 12/414,476, Dec. 1, 2011, 20 pages.
"Non-Final Office Action", U.S. Appl. No. 13/656,574, Jan. 31, 2013, 21 pages.
"Non-Final Office Action", U.S. Appl. No. 13/229,693, Mar. 12, 2013, 21 pages.
"Final Office Action", U.S. Appl. No. 13/118,339, Aug. 22, 2013, 21 pages.
"Final Office Action", U.S. Appl. No. 12/972,967, Oct. 11, 2013, 21 pages.
"Non-Final Office Action", U.S. Appl. No. 12/414,476, Aug. 3, 2011, 21 pages.
"Non-Final Office Action", U.S. Appl. No. 12/414,476, Nov. 9, 2012, 22 pages.
"Final Office Action", U.S. Appl. No. 13/229,693, Sep. 4, 2013, 23 pages.
"Non-Final Office Action", U.S. Appl. No. 13/655,386, Dec. 26, 2012, 23 pages.
"Final Office Action", U.S. Appl. No. 12/244,545, Sep. 7, 2012, 23 pages.
"Final Office Action", U.S. Appl. No. 13/118,204, Nov. 21, 2013, 24 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"Final Office Action", U.S. Appl. No. 13/118,347, Aug. 15, 2013, 25 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Advisory Action", U.S. Appl. No. 12/414,382, Jan. 20, 2012, 3 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.

(56) References Cited

OTHER PUBLICATIONS

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.

"SecureMe—Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec. 15, 2008, 3 pages.

"Advisory Action", U.S. Appl. No. 12/433,605, Apr. 5, 2012, 3 pages.

"Email Notification for Microsoft Outlook and Outlook Express", Retrieved from: <http://www.contextmagic.com/express-notification/> on Sep. 29, 2010, Jul. 21, 2004, 3 pages.

"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.

"Parallax Scrolling", Retrieved from: <http://en.wikipedia.org/wiki/Parallax_scrolling> on May 5, 2009., May 4, 2009, 3 Pages.

"Final Office Action", U.S. Appl. No. 13/118,321, Dec. 19, 2013, 30 pages.

"Mobile/UI/Designs/TouchScreen/workingUI", Retrieved from: <https://wiki.mozilla.org/Mobile/UI/Designs/TouchScreen/workingUI> on Oct. 26, 2009, 30 pages.

"Non-Final Office Action", U.S. Appl. No. 13/118,321, Jun. 10, 2013, 32 pages.

"Final Office Action", U.S. Appl. No. 13/655,386, Jun. 6, 2013, 34 pages.

"Non-Final Office Action", U.S. Appl. No. 13/224,258, Jan. 8, 2013, 35 pages.

"Final Office Action", U.S. Appl. No. 13/657,789, Jun. 21, 2013, 35 pages.

"Final Office Action", U.S. Appl. No. 13/224,258, Sep. 11, 2013, 37 pages.

"Non-Final Office Action", U.S. Appl. No. 13/657,789, Jan. 9, 2013, 38 pages.

"Calc4M", Retrieved from: <http://www.hellebo.com/Calc4M.html> on Dec. 11, 2008, Sep. 10, 2008, 4 Pages.

"Notice of Allowance", U.S. Appl. No. 12/414,455, Jan. 4, 2012, 4 pages.

"Notice of Allowance", U.S. Appl. No. 12/414,382, Apr. 4, 2012, 4 pages.

"DuoSense™ Multi-Touch Gestures", Retrieved from: <http://www.n-trig.com/Data/Uploads/Misc/DuoSenseMTG_final.pdf>, Jul. 2008, 4 pages.

"Notice of Allowance", U.S. Appl. No. 12/414,434, Aug. 17, 2012, 4 pages.

"Winterface Review", Retrieved from: <http://www.mytodayscreen.com/winterface-review/> on Nov. 12, 2008, Jul. 9, 2008, 42 pages.

"YUI 3: ScrollView [beta]", Retrieved from: <http://developer.yahoo.com/yui/3/scrollview/> on Sep. 28, 2010, 5 pages.

"Notice of Allowance", U.S. Appl. No. 13/492,495, Apr. 26, 2013, 5 pages.

"Notice of Allowance", U.S. Appl. No. 13/655,390, May 24, 2013, 5 pages.

"My Favorite Gadgets, System Monitor II", Retrieved from <http://www.myfavoritegadgets.info/monitors/SystemMonitorII/systemmonitorII.html> on Mar. 12, 2013, Jun. 8, 2010, 5 pages.

"Notice of Allowance", U.S. Appl. No. 12/977,584, Jun. 19, 2013, 5 pages.

"Non-Final Office Action", U.S. Appl. No. 13/196,272, Sep. 3, 2013, 5 pages.

"Non-Final Office Action", U.S. Appl. No. 11/305,789, Sep. 21, 2009, 5 pages.

"Notice of Allowance", U.S. Appl. No. 12/978,184, Nov. 6, 2013, 5 pages.

"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.

"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 5 Pages.

"Notice of Allowance", U.S. Appl. No. 11/215,052, Mar. 14, 2012, 5 pages.

"Notice of Allowance", U.S. Appl. No. 12/484,845, Mar. 16, 2012, 5 pages.

"Notice of Allowance", U.S. Appl. No. 12/978,184, Aug. 2, 2013, 5 pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.

"Symbian Applications", Retrieved from: <http://symbianfullversion.blogspot.com/2008_12_01_archive.html> on May 5, 2009., Jan. 2009, 51 Pages.

"Non-Final Office Action", U.S. Appl. No. 13/492,495, Dec. 19, 2012, 6 pages.

"Application User Model IDs", Retrieved from: <http://msdn.microsoft.com/en-us/library/dd378459(VS.85).aspx> on Sep. 28, 2010, 6 pages.

"Notice of Allowance", U.S. Appl. No. 12/414,458, Aug. 10, 2011, 6 pages.

"Non-Final Office Action", U.S. Appl. No. 12/414,434, Aug. 2, 2011, 6 pages.

"MIDTB Tip Sheet: Book Courier", Retrieved from: <http://www.midtb.org/tipsbookcourier.htm> on Dec. 11, 2008., Sep. 26, 2005, 6 Pages.

"Non-Final Office Action", U.S. Appl. No. 12/978,184, Jan. 23, 2013, 7 pages.

"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.

"Non-Final Office Action", U.S. Appl. No. 12/414,434, Jan. 17, 2012, 7 pages.

"Non-Final Office Action", U.S. Appl. No. 12/721,422, Oct. 1, 2012, 7 pages.

"Final Office Action", U.S. Appl. No. 12/414,382, Dec. 23, 2011, 7 pages.

"Extended European Search Report", European Patent Application No. 09818253.8, Apr. 10, 2012, 7 pages.

"Notice of Allowance", U.S. Appl. No. 12/470,558, Apr. 2, 2012, 7 pages.

"Non-Final Office Action", U.S. Appl. No. 12/414,434, May 31, 2012, 7 pages.

"Womma", Retrieved from: <http://www.womma.org/blog/links/wom-trends/> on May 5, 2009., 2007, 70 Pages.

"PCT Search Report and Written Opinion", PCT Application No. PCT/US2010/038730, Jan. 19, 2011, 8 pages.

"Notice of Allowance", U.S. Appl. No. 13/196,272, Nov. 8, 2013, 8 pages.

"Notice of Allowance", U.S. Appl. No. 11/305,789, Nov. 23, 2009, 8 pages.

"Non-Final Office Action", U.S. Appl. No. 12/977,584, Dec. 7, 2012, 8 pages.

"PCT Search Report and Written Opinion", Application No. PCT/US2011/055513, Mar. 27, 2012, 8 pages.

"Multi-touch", Retrieved from <http://en.wikipedia.org/wiki/Multi-touch#Microsoft_Surface> on Apr. 24, 2009, Apr. 17, 2009, 8 pages.

"International Search Report and Written Opinion", International Application No. PCT/US2011/055514, May 22, 2012, 8 pages.

"PCT Search Report and Written Opinion", Application No. PCT/US2011/055512, May 24, 2012, 8 pages.

"PCT Search Report and Written Opinion", Application No. PCT/US2011/055520, May 9, 2012, 8 pages.

"PCT Search Report and Written Opinion", Application No. PCT/US2011/055524, Jun. 1, 2012, 8 pages.

"Non-Final Office Action", U.S. Appl. No. 12/414,458, Jul. 6, 2011, 8 pages.

"Non-Final Office Action", U.S. Appl. No. 12/414,455, Aug. 29, 2011, 8 pages.

(56) References Cited

OTHER PUBLICATIONS

"PCT Search Report and Written Opinion", Application No. PCT/US2011/065702, Aug. 29, 2012, 8 pages.
"Non-Final Office Action", U.S. Appl. No. 13/492,495, Sep. 17, 2012, 8 pages.
"PCT Search Report and Written Opinion", Application No. PCT/US2011/055736, Sep. 17, 2012, 8 pages.
"PCT Search Report and Written Opinion", Application No. PCT/US2011/067073, Sep. 17, 2012, 8 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Final Office Action", U.S. Appl. No. 11/502,264, Apr. 3, 2009, 9 pages.
"Non-Final Office Action", U.S. Appl. No. 12/470,558, Nov. 22, 2011, 9 pages.
"PCT Search Report and Written Opinion", Application No. PCT/US2011/055511, Apr. 24, 2012, 9 pages.
"PCT Search Report and Written Opinion", Application No. PCT/US2011/055523, May 10, 2012, 9 pages.
"International Search Report and Written Opinion", International Application No. PCT/US2011/055521, May 15, 2012, 9 pages.
"International Search Report and Written Opinion", International Application No. PCT/US2011/055522, May 15, 2012, 9 pages.
"Notice of Allowance", U.S. Appl. No. 12/721,422, Jul. 11, 2013, 9 pages.
"Non-Final Office Action", U.S. Appl. No. 12/414,382, Jul. 26, 2011, 9 pages.
"PCT Search Report and Written Opinion", Application No. PCT/US2011/055496, Sep. 12, 2012, 9 pages.
"PCT Search Report and Written Opinion", Application No. PCT/US2011/055712, Sep. 21, 2012, 9 pages.
"PCT Search Report and Written Opinion", Application No. PCT/US2011/055493, 9/26/212, 9 pages.
"PCT Search Report and Written Opinion", Application No. PCT/US2011/055478, Sep. 27, 2012, 9 pages.
"PCT Search Report and Written Opinion", Application No. PCT/US2011/055746, Sep. 27, 2012, 9 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"Adobe Acrobat 8 Standard User Guide", Adobe Systems Incorporated,2007, pp. 34 & 36.
"iPod touch User Guide for iPhone OS 3.0 Software", Apple Inc.,2009, 153 pages.
"International Search Report", Application No. PCT/US2010/028553, Application Filing Date: Mar. 24, 2010,Nov. 9, 2010, 9 pages.
"Android 2.3 User's Guide", AUG-2.3-103, Android mobile technology platform 2.3,Dec. 13, 2010, 380 pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Internet Explorer Window Restrictions", Retrieved from: http://technet.microsoft.com/en-us/library/cc759517(WS.10).aspx on Jun. 28, 2011, Microsoft TechNet, 5 pages.
"iPad User Guide", retrieved from <http://cyndidannerkuhn.info/CDK/iPads_Resources_files/iPad_User_Guide.pdf> on Jun. 17, 2011, 154 pages.
"Notifications", retrieved from <http://msdn.microsoft.com/en-us/library/aa511497.aspx> on May 10, 2011, 16 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011,May 28, 2010, 1 page.
"Windows 8 Is Gorgeous, But Is It More Than Just A Shell? (Video)", retrieved from <http://techcrunch.com/2011/06/02/windows-8-gorgeous-shell-video/> on Jun. 20, 2011,Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Snap", Windows 7 Features, retrieved from <http://windows.microsoft.com/en-US/windows7/products/features/snap> on Sep. 23, 2011, 2 pages.
"User Guide", retrieved from <http://wireframesketcher.com/help/help.html> on Jun. 17, 2011, 19 pages.
"Top Android App: Swipepad", Best Android Apps Review, retrieved from <http://www.bestandroidappsreview.com/2011/01/top-android-app-swipepad-launcher.html> on May 11, 2011, 4 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Working with Multiple Windows", MSOFFICE tutorial!, retrieved from <http://www.msoffice-tutorial.com/working-with-multiple-windows.php> on Sep. 23, 2011, 3 pages.
"New Features in WhatsUp Gold v12.0", retrieved from <http://www.netbright.co.th/?name=product&file=readproduct&id=12> on Jun. 10, 2011, 4 pages.
"Basics of Your Device: Get Familiar with the Home Screen", Nokia USA—How to, retrieved from <http://www.nokia.ca/get-support-and-software/product-support/c6-01/how-to#> on May 11, 2011, 3 pages.
"OmneMon™ System Resource Metrics", retrieved from <http://www.omnesys.com/documents/OmneMonSRM_Brochure.pdf> on Jun. 10, 2011, 3 pages.
"The Map Screen", retrieved from <http://www.symbianos.org/whereamiusersguide> on Jun. 17, 2011, 3 pages.
"Top 3 Task Switchers for Andriod", TechCredo, retrieved from <http://www.techcredo.com/android/top-3-task-switchers-for-android> on May 11, 2011,Mar. 9, 2011, 5 pages.
"Magic mouse", Retrieved from: <http://www.apple.com/magicmouse/> on May 10, 2011, 3 pages.
Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates, "A Framework to Support Large-Scale Active Applications", University of Cambridge Computer Laboratory, Available at <http://citeseerx.ist.psu.edu/viewdoc/download?doi=10.1.1.48.1690&rep=rep1&type=pdf >,1996, 8 pages.
Beiber, et al., "Screen Coverage: A Pen-Interaction Problem for PDA's and Touch Screen Computers", In Proceedings of ICWMC 2007,Mar. 2007, 6 pages.
Bjork, et al., "Redefining the Focus and Context of Focus+Context Visualizations", In Proceedings of INFOVIS 2000, Available at <http://www.johan.redstrom.se/papers/redefining.pdf>,Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bowes, et al., "Transparency for Item Highlighting", Faculty of Computing Science, Dalhousie University, Available at <http://torch.cs.dal.ca/~dearman/pubs/GI2003-bowes,dearman,perkins-paper.pdf>,2003, 2 pages.
Bruzzese, "Using Windows 7, Managing and Monitoring Windows 7—Chapter 11", Que Publishing, May 5, 2010, 33 pages.

(56) References Cited

OTHER PUBLICATIONS

Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf>,Sep. 2006, pp. 829-836.
Carrera, et al., "Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley, "Windows Phone 7 Customization Tips and Tricks", retrieved from <http://www.brighthub.com/mobile/windows-mobile-platform/articles/95213.aspx> on Jun. 20, 2011,May 16, 2011, 2 pages.
Cawley, "How to Customise Your Windows Phone 7", Retrieved from: <http://www.brighthub.com/mobile/windows-mobile-platform/articles/95213.aspx> on May 10, 2011,Nov. 12, 2010, 3 pages.
Cohen, et al., "Wang Tiles for Image and Texture Generation", In Proceedings of SIGGRAPH 2003, Available <http://research.microsoft.com/en-us/um/people/cohen/WangFinal.pdf>,2003, 8 pages.
Damien, "7 Ways to Supercharge Multitasking in Android", retrieved from <http://maketecheasier.com/7-ways-to-supercharge-multitasking-in-android/2011/01/22/> on May 11, 2011,Jan. 22, 2011, 5 pages.
Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky, "Sending Tile Push Notifications on Windows Phone 7", retrieved from <http://mobile.dzone.com/articles/sending-tile-push> on May 10, 2011,Aug. 25, 2010, 2 pages.
Denoue, et al., "WebNC: Efficient Sharing of Web Applications", In Proceedings of WWW 2009, Available at <http://www.fxpal.com/publications/FXPAL-PR-09-495.pdf>,2009, 2 pages.
Dolcourt, "Webware", Retrieved from: <http://news.cnet.com/webware/?categoryId=2010> on May 5, 2009., 13 Pages.
Dunsmuir, "Selective Semantic Zoom of a Document Collection", Available at <http://www.cs.ubc.ca/~tmm/courses/533/projects/dustin/proposal.pdf>,Oct. 30, 2009, pp. 1-9.
Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.
Farrugia, et al., "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, Oct. 21, 2008, 2 pages.
Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade, "Samsung Alias u740", Retrieved from: <http://www.mobiletechreview.com/phones/Samsung-U740.htm> on Nov. 20, 2008, Mar. 14, 2007, 6 pages.
Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.
Gralla, "Windows XP Hacks, Chapter 13—Hardware Hacks", O'Reilly Publishing, Feb. 23, 2005, 25 pages.
Ha, et al., "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.
Hickey, "Google Android has Landed; T-Mobile, HTC Unveil G1", Retrieved from: <http://www.crn.com/retail/210603348> on Nov. 26, 2008., Sep. 23, 2008, 4 pages.
Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek, et al., "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf >,Feb. 15, 2005, pp. 1-15.
Kcholi, "Windows CE .NET Interprocess Communication", Retrieved from http://msdn.microsoft.com/en-us/library/ms836784.aspx on Jul. 17, 2008., Jan. 2004, 15 Pages.
Keranen, "OpenGL-based User Interface Toolkit for Symbian Mobile Devices", Master of Science Thesis, Tamere University of Technology, Department of Information Technology, Apr. 6, 2005, 88 pages.
Kurdi, "WinSplit Revolution", Retrieved from <http://www.freewaregenius.com/winsplit-revolution/> on Jun. 30, 2013, Aug. 22, 2007, 4 Pages.
Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
La, "Parallax Gallery", Available at <http://webdesignerwall.comtutorials/parallax-gallery/comment-page-1>,Apr. 25, 2008, 16 pages.
Livingston, et al., "Windows 95 Secrets", 1995, I DG Books Worldwide, 3rd Edition, 1995, pp. 121-127.
Long, "Gmail Manager 0.6", Retrieved from: <https://addons.mozilla.org/en-US/firefox/addon/1320/> on Sep. 29, 2010, Jan. 27, 2010, 4 pages.
Mann, et al., "Spectrum Analysis of Motion Parallax in a 3D Cluttered Scene and Application to Egomotion", Journal of the Optical Society of America A, vol. 22, No. 9, Available at <http://www.cs.uwaterloo.ca/~mannr/snow/josa-mann-langer.pdf>,Sep. 2005, pp. 1717-1731.
Mantia, "Multitasking: What Does It Mean?", retrieved from <http://mantia.me/blog/multitasking/> on Sep. 23, 2011, 3 pages.
Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.
Marie, "MacBook Trackpad Four Fingers Swipe Left/Right to Switch Applications", MacBook Junkie, retrieved from <http://www.macbookjunkie.com/macbook-trackpad-four-fingers-swipe-left-right-to-switch-applications/> on May 11, 2011,Nov. 13, 2010, 4 pages.
Mei, et al., "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.
Nordgren, "Development of a Touch Screen Interface for Scania Interactor", Master's Thesis in Computing Science, UMEA University, Available at <http://www.cs.umu.se/education/examina/Rapporter/PederNordgren.pdf>,Apr. 10, 2007, pp. 1-59.
Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.
Oryl, "Review: Asus P527 Smartphone for North America", Retrieved from: <http://www.mobileburn.com/review.jsp?Id=4257> on Dec. 17, 2008., Mar. 5, 2008, 1 Page.
Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.
Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.

(56) References Cited

OTHER PUBLICATIONS

Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.

Perry, "Teach Yourself Windows 95 in 24 Hours", 1997, Sams Publishing, 2nd Edition, 1997, pp. 193-198.

Raghaven, et al., "Model Based Estimation and Verification of Mobile Device Performance", Available at http://alumni.cs.ucsb.edu/~raimisl/emsoft04_12.pdf.,Sep. 27-29, 2004, 10 Pages.

Rathbone, "Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.

Ray, "Microsoft Re-Tiles Mobile Platform for Windows 7 Era", retrieved from <http://www.theregister.co.uk/2010/02/15/windows_phone_7_series/> on May 11, 2011,Feb. 15, 2010, 2 pages.

Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.

Remond, "Mobile Marketing Solutions", Retrieved from: <http://www.mobilemarketingmagazine.co.uk/mobile_social_networking/> on May 5, 2009., Apr. 28, 2009, 16 Pages.

Rice, et al., "A System for Searching Sound Palettes", Proceedings of the Eleventh Biennial Symposium on Arts and Technology,, Available at <http://www.comparisonics.com/FindSoundsPalettePaper.pdf>,Feb. 2008, 6 pages.

Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.

Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.

Roberts, "Touching and Gesturing on the iPhone", Available at <http://www.sitepen.com/blog/2008/07/10/touching-and-gesturing-on-the-iphone/comments-pare-1>,Jul. 10, 2008, 16 pages.

Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.

Singh, et al., "CINEMA: Columbia InterNet Extensible Multimedia Architecture", Available at <http://www1.cs.columbia.edu/~library/TR-repository/reports/reports-2002/cucs-011-02.pdf>,Sep. 3, 2002, 83 Pages.

Smith, et al., "GroupBar: The TaskBar Evolved", Proceedings of OZCHI 2003, Available at <http://research.microsoft.com/pubs/64316/ozchi2003-groupbar.pdf>,Nov. 2003, pp. 1-10.

Steinicke, et al., "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.

Suror, "PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra, "Beta Beat: Grape, a New Way to Manage Your Desktop Clutter", Retrieved from: Beta Beat: Grape, a New Way to Manage Your Desktop Clutter on Jun. 28, 2011, Apr. 14, 2009, 4 pages.

Vallerio, et al., "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen, "BlackBerry PlayBook Hands-on", retrieved from <http://mybroadband.co.za/news/gadgets/20104-BlackBerry-PlayBook-hands-.html> on May 11, 2011,May 8, 2011, 4 pages.

Viticci, "Growl 1.3 To Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011,Jul. 6, 2011, 6 pages.

Vornberger, "Bluetile", Retrieved from: <http://www.bluetile.org> on Sep. 29, 2010, 5 pages.

Wilson, "How the iPhone Works", Retrieved from: <http://electronics.howstuffworks.com/iphone2.htm> on Apr. 24, 2009, Jan. 2007, 9 pages.

Wilson, "Robust Computer Vision-Based Detection of Pinching for One and Two-Handed Gesture Input", In Proceedings of UIST 2006, Available at <http://research.microsoft.com/en-us/um/people/awilson/publications/wilsonuist2006/uist%202006%20taffi.pdf>,Oct. 2006, 4 pages.

Wobbrock, et al., "User-Defined Gestures for Surface Computing", CHI 2009, Apr. 4-9, 2009, Boston, MA, available at <http://faculty.washington.edu/wobbrock/pubs/chi-09.2.pdf>,Apr. 4, 2009, 10 pages.

Wu, et al., "Achieving a Superior Ownership Experience in Manageability and Quality for Siebel CRM", available at <http://www.oracle.com/us/products/enterprise-manager/superior-exp-for-siebel-crm-068962.pdf>,Aug. 2008, 25 pages.

Wyatt, "/Flash/the art of parallax scrolling", .net Magazine,Aug. 1, 2007, pp. 74-76.

Yang, et al., "Semantic Photo Album Based on MPEG-4 Compatible Application Format", Retrieved from: <http://ieeexplore.ieee.org/stamp/stamp.jsp?arnumber=04146254.>, 2007, 2 Pages.

"Final Office Action", U.S. Appl. No. 13/224,258, Jul. 18, 2014, 39 pages.

"Final Office Action", U.S. Appl. No. 13/228,876, Jul. 18, 2014, 15 pages.

"First Examination Report", NZ Application No. 618269, May 20, 2014, 2 pages.

"First Examination Report", NZ Application No. 618284, May 20, 2014, 2 pages.

"Foreign Office Action", CN Application No. 201180071186.4, Jun. 13, 2014, 12 pages.

"Non-Final Office Action", U.S. Appl. No. 13/118,288, Jul. 2, 2014, 17 pages.

"Non-Final Office Action", U.S. Appl. No. 13/229,693, Jun. 20, 2014, 25 pages.

"Non-Final Office Action", U.S. Appl. No. 13/229,702, Jul. 3, 2014, 28 pages.

"Non-Final Office Action", U.S. Appl. No. 13/657,621, Jul. 18, 2014, 22 pages.

"Non-Final Office Action", U.S. Appl. No. 13/657,646, Aug. 12, 2014, 14 pages.

"Notice of Allowance", U.S. Appl. No. 13/118,204, Jul. 8, 2014, 8 pages.

"Notice of Allowance", U.S. Appl. No. 13/657,789, Aug. 4, 2014, 16 pages.

"Authoritative Dictionary of IEEE Standards Terms, 7th ed.", Definitions—processor, memory, and storage, 2000, 3 pages.

"Extended European Search Report", EP Application No. 11872137.2, Apr. 9, 2015, 12 pages.

"Final Office Action", U.S. Appl. No. 13/118,321, Apr. 2, 2015, 30 pages.

"Foreign Notice of Allowance", CN Application No. 201110429183.5, Mar. 9, 2015, 4 Pages.

"Foreign Office Action", CN Application No. 201210317470.1, Feb. 11, 2015, 9 pages.

"Foreign Office Action", CN Application No. 201210331670.2, Mar. 25, 2015, 14 pages.

"Foreign Office Action", CN Application No. 201210331686.3, Mar. 3, 2015, 14 pages.

"Non-Final Office Action", U.S. Appl. No. 13/073,300, Apr. 30, 2015, 15 pages.

"Non-Final Office Action", U.S. Appl. No. 13/229,693, Apr. 23, 2015, 28 pages.

(56) References Cited

OTHER PUBLICATIONS

"Non-Final Office Action", U.S. Appl. No. 13/550,432, Apr. 27, 2015, 15 pages.
"Non-Final Office Action", U.S. Appl. No. 13/904,880, May 4, 2015, 22 pages.
"Notice of Allowance", U.S. Appl. No. 13/118,333, May 4, 2015, 16 pages.
"Notice of Allowance", U.S. Appl. No. 13/118,339, Mar. 31, 2015, 7 pages.
"Notice of Allowance", U.S. Appl. No. 13/118,347, Apr. 1, 2015, 7 pages.
"Notice of Allowance", U.S. Appl. No. 13/229,702, Apr. 29, 2015, 7 pages.
"Rename a file", Retrieved from <http://windows.microsoft.com/en-us/windows7/rename-a-file> on Apr. 27, 2015, Aug. 24, 2009, 1 page.
"Supplemental Notice of Allowance", U.S. Appl. No. 14/089,149, Mar. 20, 2015, 2 pages.
"Corrected Notice of Allowance", U.S. Appl. No. 13/656,574, Jan. 13, 2015, 4 pages.
"Corrected Notice of Allowance", U.S. Appl. No. 13/656,574, Dec. 12, 2014, 4 pages.
"Corrected Notice of Allowance", U.S. Appl. No. 14/089,149, Feb. 20, 2015, 2 pages.
"Extended European Search Report", EP Application No. 11866553.8, Dec. 9, 2014, 7 pages.
"Extended European Search Report", EP Application No. 11866579.3, Oct. 9, 2014, 7 pages.
"Extended European Search Report", EP Application No. 11866699.9, Jan. 15, 2015, 6 pages.
"Extended European Search Report", EP Application No. 11866772.4, Jan. 15, 2015, 6 pages.
"Extended European Search Report", EP Application No. 11867033.0, Nov. 27, 2014, 8 pages.
"Final Office Action", U.S. Appl. No. 13/118,265, Nov. 6, 2014, 19 pages.
"Final Office Action", U.S. Appl. No. 13/118,288, Nov. 7, 2014, 14 pages.
"Final Office Action", U.S. Appl. No. 13/118,292, Dec. 5, 2014, 30 pages.
"Final Office Action", U.S. Appl. No. 13/228,888, Oct. 24, 2014, 29 pages.
"Final Office Action", U.S. Appl. No. 13/228,931, Dec. 19, 2014, 27 pages.
"Final Office Action", U.S. Appl. No. 13/228,945, Oct. 23, 2014, 24 pages.
"Final Office Action", U.S. Appl. No. 13/229,693, Jan. 6, 2015, 24 pages.
"Final Office Action", U.S. Appl. No. 13/229,702, Jan. 15, 2015, 24 pages.
"Final Office Action", U.S. Appl. No. 13/657,621, Jan. 15, 2015, 22 pages.
"Foreign Notice of Acceptance", NZ Application No. 618269, Oct. 31, 2014, 1 Page.
"Foreign Notice of Allowance", CN Application No. 201110437572.2, Mar. 3, 2015, 3 Pages.
"Foreign Office Action", CN Application No. 201110437542.1, Jan. 28, 2015, 7 pages.
"Foreign Office Action", CN Application No. 201110437542.1, Aug. 20, 2014, 8 pages.
"Foreign Office Action", CN Application No. 201110454251.3, Feb. 28, 2015, 9 Pages.
"Foreign Office Action", CN Application No. 201110454251.3, Oct. 21, 2014, 13 Pages.
"Foreign Office Action", CN Application No. 201180071186.4, Jan. 20, 2015, 8 pages.
"Foreign Office Action", CN Application No. 201180071196.8, Sep. 11, 2014, 13 pages.
"Foreign Office Action", CN Application No. 201210331158.8, Sep. 3, 2014, 16 Pages.
"Foreign Office Action", CN Application No. 201210331188.9, Oct. 10, 2014, 12 pages.
"Foreign Office Action", CN Application No. 201210331564.4, Dec. 3, 2014, 12 pages.
"Foreign Office Action", CN Application No. 201210331584.1, Nov. 3, 2014, 14 pages.
"Foreign Office Action", CO Application No. 13300256, Sep. 24, 2014, 8 Pages.
"Foreign Office Action", CO Application No. 13300265, Sep. 24, 2014, 10 Pages.
"Non-Final Office Action", U.S. Appl. No. 12/972,967, Nov. 6, 2014, 17 pages.
"Non-Final Office Action", U.S. Appl. No. 13/118,321, Nov. 12, 2014, 33 pages.
"Non-Final Office Action", U.S. Appl. No. 13/118,339, Dec. 10, 2014, 16 pages.
"Non-Final Office Action", U.S. Appl. No. 13/118,347, Dec. 3, 2014, 28 pages.
"Non-Final Office Action", U.S. Appl. No. 13/228,707, Nov. 13, 2014, 20 pages.
"Non-Final Office Action", U.S. Appl. No. 13/228,876, Jan. 29, 2015, 18 pages.
"Non-Final Office Action", U.S. Appl. No. 13/229,155, Jan. 7, 2015, 14 pages.
"Non-Final Office Action", U.S. Appl. No. 13/345,383, Jan. 29, 2015, 5 pages.
"Non-Final Office Action", U.S. Appl. No. 14/089,149, Nov. 3, 2014, 8 pages.
"Notice of Allowance", U.S. Appl. No. 13/657,646, Feb. 6, 2015, 15 pages.
"Notice of Allowance", U.S. Appl. No. 14/089,149, Dec. 5, 2014, 4 pages.
"Supplemental Notice of Allowance", U.S. Appl. No. 13/118,204, Oct. 2, 2014, 2 pages.
"Supplemental Notice of Allowance", U.S. Appl. No. 13/118,204, Oct. 23, 2014, 3 pages.
"Supplemental Notice of Allowance", U.S. Appl. No. 13/656,574, Feb. 25, 2015, 4 pages.
Camick, "Wrap Layout", Java Tips Weblog, retrieved from <https://tips4java.wordpress.com/2008/11/06/wrap-layout/> on Jan. 11, 2015, Nov. 6, 2008, 28 pages.
Webmonkey "HTML Cheatsheet", Retrieved From: <http://www.webmonkey.com/2010/02/html_cheatsheet> on Nov. 7, 2014, Feb. 15, 2010, 5 pages.
"Corrected Notice of Allowance", U.S. Appl. No. 13/118,333, Jun. 1, 2015, 4 pages.
"Extended European Search Report", EP Application No. 11871863.4, May 11, 2015, 8 pages.
"Extended European Search Report", EP Application No. 11871917.8, May 11, 2015, 9 pages.
"Final Office Action", U.S. Appl. No. 13/228,707, Jun. 1, 2015, 20 pages.
"Final Office Action", U.S. Appl. No. 13/228,876, Jun. 19, 2015, 20 pages.
"Final Office Action", U.S. Appl. No. 13/229,155, Jun. 4, 2015, 16 pages.
"Foreign Office Action", CL Application No. 3368-2013, May 7, 2015, 7 pages.
"Foreign Office Action", CL Application No. 3370-2013, May 7, 2015, 6 pages.
"Foreign Office Action", CN Application No. 201180071186.4, Jun. 2, 2015, 7 pages.
"Foreign Office Action", CN Application No. 201210331158.8, May 11, 2015, 7 pages.
"Foreign Office Action", CO Application No. 13300256, Apr. 11, 2015, 8 Pages.
"Foreign Office Action", CO Application No. 13300265, Apr. 21, 2015, 11 Pages.
"Foreign Office Action", PH Application No. PH/1/2013/502367, Apr. 24, 2015, 3 pages.
"Non-Final Office Action", U.S. Appl. No. 14/659,442, Jul. 7, 2015, 7 pages.

(56) References Cited

OTHER PUBLICATIONS

"Notice of Allowance", U.S. Appl. No. 13/345,383, May 18, 2015, 5 pages.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Jetter,"Materializing the Query with Facet-Streams—A Hybrid Surface for Collaborative Search on Tabletops", May 7, 2011, 10 pages.
"Corrected Notice of Allowance", U.S. Appl. No. 13/118,333, Aug. 4, 2015, 4 pages.
"Corrected Notice of Allowance", U.S. Appl. No. 13/118,333, Sep. 14, 2015, 4 pages.
"Extended European Search Report", EP Application No. 11872072.1, Jul. 28, 2015, 7 pages.
"Final Office Action", U.S. Appl. No. 12/983,106, Jul. 16, 2015, 23 pages.
"Final Office Action", U.S. Appl. No. 13/073,300, Sep. 4, 2015, 17 pages.
"Final Office Action", U.S. Appl. No. 13/224,258, Aug. 13, 2015, 39 pages.
"Final Office Action", U.S. Appl. No. 13/550,432, Sep. 14, 2015, 18 pages.
"Foreign Notice of Allowance", CN Application No. 201110437542.1, Aug. 3, 2015, 4 Pages.
"Foreign Office Action", CN Application No. 201210317470.1, Aug. 24, 2015, 9 pages.
"Further Examination Report", NZ Application No. 618284, Jul. 13, 2015, 2 pages.
"Non-Final Office Action", U.S. Appl. No. 13/118,265, Aug. 20, 2015, 18 pages.
"Non-Final Office Action", U.S. Appl. No. 13/118,288, Aug. 24, 2015, 19 pages.
"Non-Final Office Action", U.S. Appl. No. 13/118,321, Sep. 8, 2015, 34 pages.
"Non-Final Office Action", U.S. Appl. No. 14/059,163, Aug. 10, 2015, 5 pages.
"Notice of Allowance", U.S. Appl. No. 13/229,693, Sep. 14, 2015, 13 pages.
"Notice of Allowance", U.S. Appl. No. 14/659,442, Aug. 19, 2015, 4 pages.
Gladisch,"MultiStates:Monitoring Databases With Acoustic and Intuitive Perspective Wall Interaction", In Proceedings of 2nd International Workshop on Design & Evaluation of e-Government Applications and Services, Aug. 24, 2009, 7 pages.
Johnson,"Create an Awesome Zooming Web Page With jQuery", Retrieved from <http://designshack.net/articles/javascript/create-an-awesome-zooming-web-page-with-jquery/> on Aug. 20, 2015, May 25, 2011, 11 pages.

\* cited by examiner

APPLICATION REPORTING IN AN APPLICATION-SELECTABLE USER INTERFACE

PRIORITY APPLICATION

This application is a continuation of and claims priority to U.S. patent application Ser. No. 12/978,184 filed Dec. 23, 2010, entitled "Application Reporting in an Application-Selectable User Interface", the disclosure of which is incorporated by reference herein in its entirety.

BACKGROUND

Conventional operating systems permit users to launch applications, often through a user interface having selectable icons for the applications. In some cases a user selects to launch an application from this user interface and does not care whether there is anything new for that application.

In many cases, however, users launch applications to find out what is new in those applications. A user wishing to find out what is new in her applications, for example, typically selects an icon for a desired application, in response to which the conventional operating system launches the application. This application then opens and, assuming it is one that presents content, presents that content. For some applications, such as news or social-networking websites, the application retrieves content from a remote source and then presents that content. It is at this point that the user sees the content, which may or may not be new since the last time the user viewed content for that application.

The user may continue this process of selecting applications, in response to which they are launched and present content, and then viewing the presented content to find out what, if anything, is new. Following this process will permit a user to see what is new in her applications, but doing so takes significant amounts of time and effort. This process also expends computing and bandwidth resources. Worse still, in some cases her applications may not have any new content, in which case all of this time, effort, and resources are wasted.

SUMMARY

This document describes techniques for application reporting in an application-selectable user interface. These techniques permit a user to view reports for applications in a user interface through which these applications may be selected. By so doing, a user may quickly and easily determine which applications to select based on their respective reports and then select them through the user interface.

This summary is provided to introduce simplified concepts for application reporting in an application-selectable user interface that is further described below in the Detailed Description. This summary is not intended to identify essential features of the claimed subject matter, nor is it intended for use in determining the scope of the claimed subject matter. Techniques and/or apparatuses for application reporting in an application-selectable user interface are also referred to herein separately or in conjunction as the "techniques" as permitted by the context.

BRIEF DESCRIPTION OF THE DRAWINGS

Embodiments for application reporting in an application-selectable user interface are described with reference to the following drawings. The same numbers are used throughout the drawings to reference like features and components.

DETAILED DESCRIPTION

Overview

Figure 1:
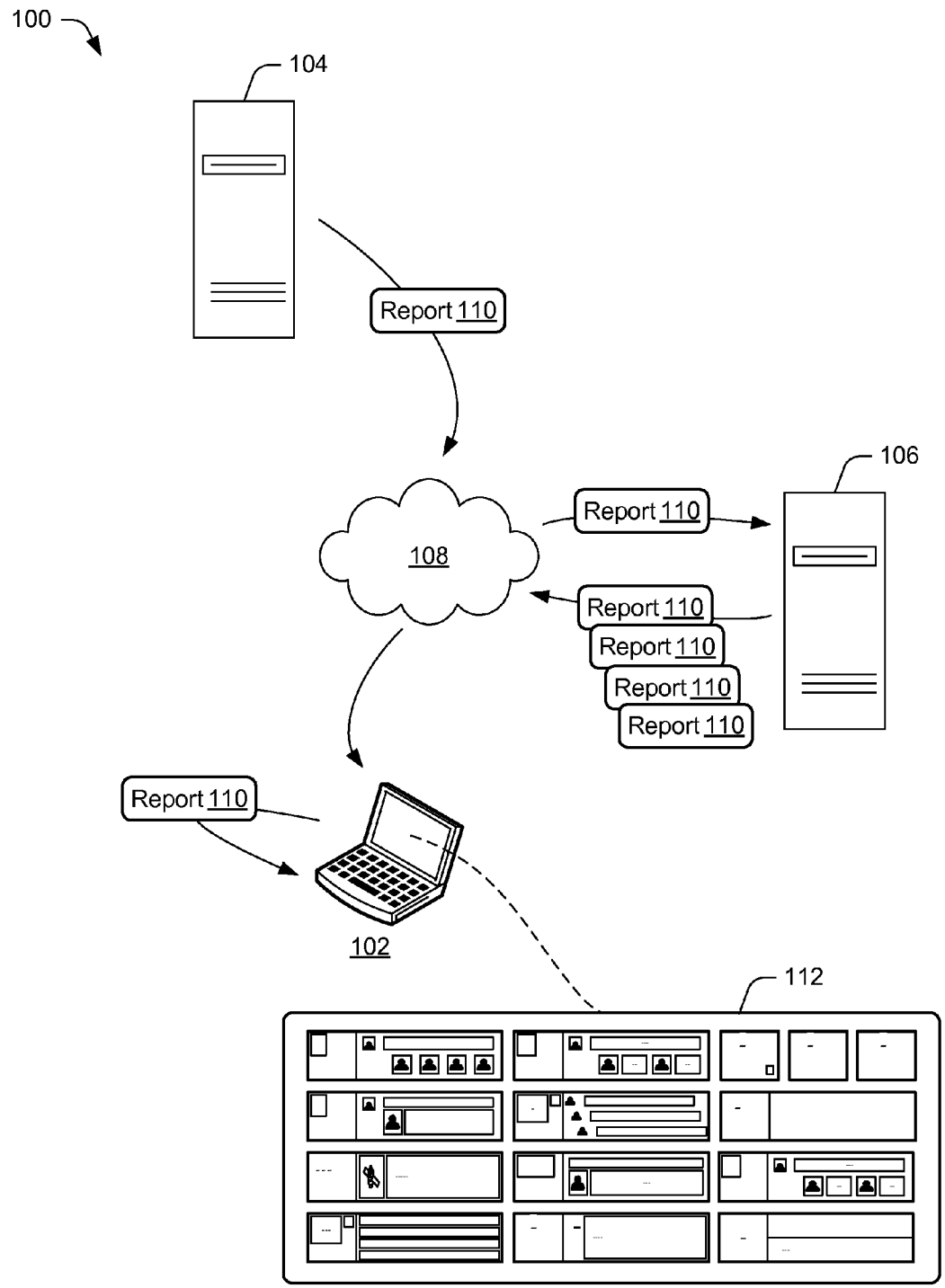
FIG. 1 illustrates an example system in which techniques for application reporting in an application-selectable user interface can be implemented.

This document describes techniques and apparatuses for application reporting in an application-selectable user interface. These techniques enable a user to see a report from an application that may or may not be currently executing and to select this application. If the application is executing, the techniques present the application responsive to the selection. If the application is not already executing the techniques first execute the application.

Assume, for example, that a user wishes to check what is new for her fifteen favorite applications. Assume that the user viewed four of these applications earlier during the day, but did not view the other eleven. Thus, some of these four applications may still be executing, thought that is not required. These techniques present, in a user interface from which these fifteen applications may be selected, reports for each of the applications, assuming any reports have arrived since the respective applications where last selected.

By way of example, assume that reports have been received for two of the four applications viewed earlier in the day. One of these applications is local to the user's computing device, namely an email application. The techniques report, in an application-selectable user interface, that eight emails have arrived since the user last used the email application. The techniques also indicate some content associated with one or more of these emails, such as from whom they were received (e.g., Suzy Brown, Sales.com, etc.).

Assume that the other of the two applications is a social-networking website and that a report has been received that indicates that a friend of the user has added an entry to her social-networking page. The techniques indicate this in the user interface, and may also present content from the entry, such as "Bill Jones tagged you in a photo" along with a thumbnail image associated with Bill Jones (e.g., his picture).

Assume that a third application has received a report, this third application being a marketing website that has not recently been viewed by the user. The techniques report that this marketing website has a big sale going on through tomorrow.

As this example illustrates, the techniques can provide a user interface through which a user can view reports associated with multiple applications and select to present those applications. Here the user interface reports that a friend tagged the user, that a sale is on, and that eight emails from various entities have been received. Further still, the user interface shows that the other twelve applications have nothing new to report.

With all of this information at the user's fingertips, she may decide which application to select and which not to. She may select the social-networking website application to see the image in which she is tagged, the marketing application to see more about the sale, the email application to see the full content of one or more of the eight emails, or forgo selecting any of the applications. Thus, the user may decide that none of these reports are interesting enough to select the applications. In all of these cases the techniques permitted the user to make quick, easy, and informed decisions about what applications to select or not to select.

This is but one example of the many ways in which the techniques enable users to see reports from, and select application through, a user interface. Numerous other examples, as well as ways in which the techniques operate, are described below.

This discussion proceeds to describe an example environment in which the techniques may operate, methods performable by the techniques, and an example apparatus below.

Example Environment

Figure 2:
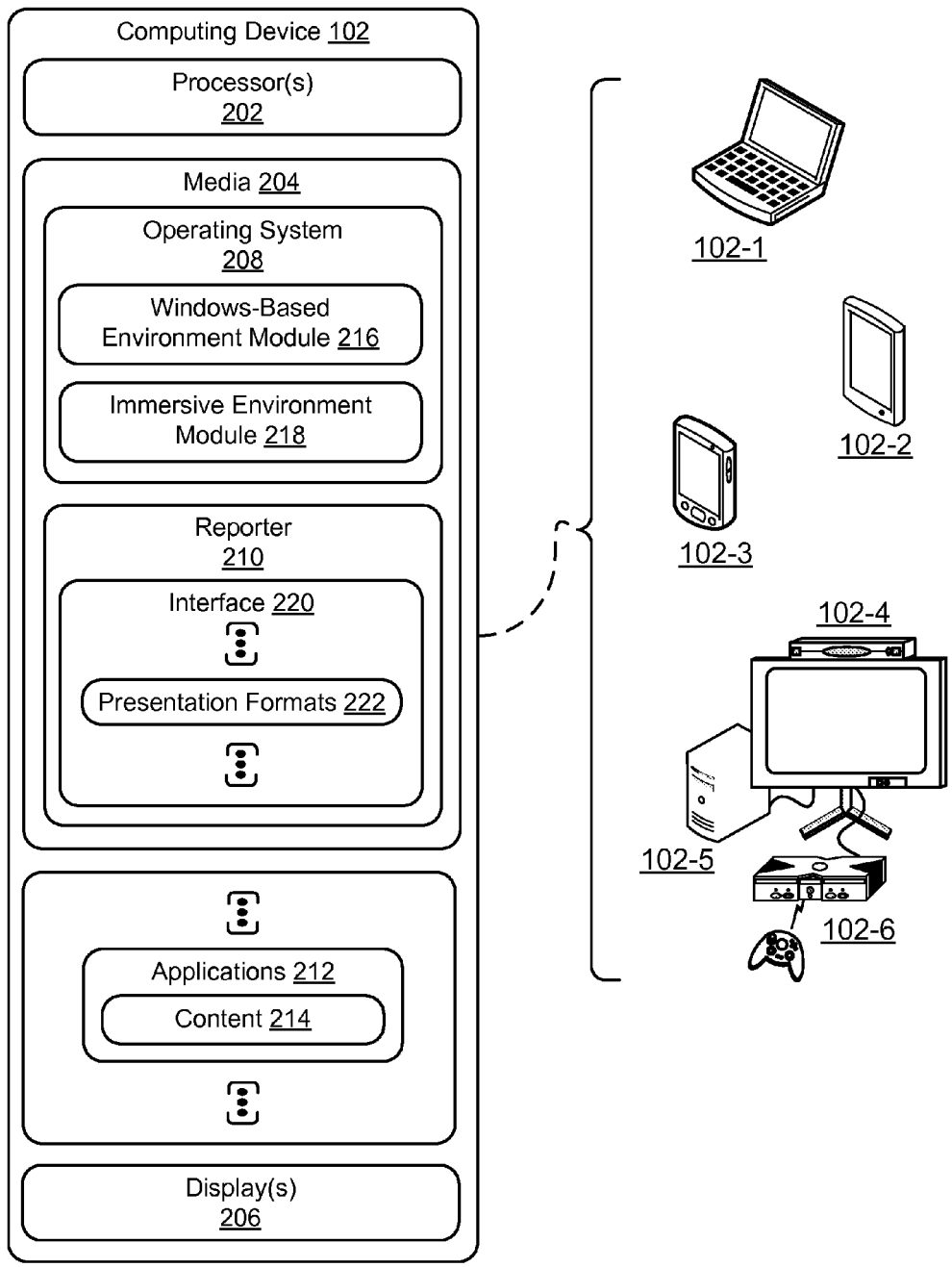
FIG. 2 illustrates an example embodiment of the computing device of FIG. 1.

FIG. 1 illustrates an example environment 100 in which techniques for application reporting in an application-selectable user interface can be embodied. Environment 100 includes a computing device 102, remote provider 104, optional report compiler 106, and communication network 108, which enables communication between these entities. In this illustration, computing device 102 receives reports 110 from three sources, remote provider 104, report compiler 106, and an application executing on computing device 102 (this application is shown in FIG. 2). Reports 110 indicate what is new or of potential interest for the selectable applications, such as a change to an application's content or status (e.g., a new email, entry, or article, or that a software update or expiration is approaching, to name just a few). Computing device 102 presents user interface 112, which includes selectable labels for applications and reports some or all of the information received in reports 110.

FIG. 2 illustrates an example embodiment of computing device 102 of FIG. 1, which is illustrated with six examples devices: a laptop computer 102-1, a tablet computer 102-2, a smart phone 102-3, a set-top box 102-4, a desktop computer 102-5, and a gaming device 102-6, though other computing devices and systems, such as servers and netbooks, may also be used.

Computing device 102 includes or has access to computer processor(s) 202, computer-readable storage media 204 (media 204), and one or more displays 206, four examples of which are illustrated in FIG. 2. Media 204 includes an operating system 208, reporter 210, and applications 212, each of which may provide content 214.

Operating system 208 includes or has access to window-based environment module 216 and/or immersive environment module 218. Applications selected through the techniques can be presented through a windows-based or immersive environment, as well as others.

Windows-based environment module 216 presents applications and accompanying content through windows having frames. These frames provide controls through which to interact with an application and/or controls enabling a user to move and size the window.

Immersive environment module 218 provides an environment by which a user may view and interact with one or more of applications 212 and corresponding content 214. In some embodiments, this environment presents content of, and enables interaction with, applications with little or no window frame and/or without a need for a user to manually size or position content. This environment can be, but is not required to be, hosted and/or surfaced without use of a typical desktop environment. Thus, in some cases immersive environment module 218 presents an immersive environment that is not a window (even one without a substantial frame) and precludes usage of desktop-like displays (e.g., a taskbar). Further still, in some embodiments this immersive environment is similar to an operating system in that it is not closeable or capable of being un-installed. Examples of immersive environments are provided below as part of describing the techniques, though they are not exhaustive or intended to limit the techniques.

Reporter 210 includes, has access to, or generates an application-selectable user interface 220, an example of which is shown at 112 in FIG. 1. Interface 220 includes or has access to presentation formats 222. Reporter 210 reports changes associated with one or more of applications 212 through interface 220. As noted above, reports 110 may be received directly from one or more of applications 212, or another entity associated with one or more of applications 212, such as remote provider 104 or report compiler 106.

In some cases a report indicates which presentation format 222 is intended, in which case reporter 210 reports changes in the appropriate format through interface 220. Presentation formats 222 can be eXtensible Stylesheet Language Transformations (XSLT) in cases where reports 110 are received in eXtensible Markup Language (XML). In such a case, reporting in interface 220 is presenting using Hyper-Text Markup Language (HTML), though use of XSLT, XML, and HTML are optional, as are presentation formats 222 in general.

Figure 3:
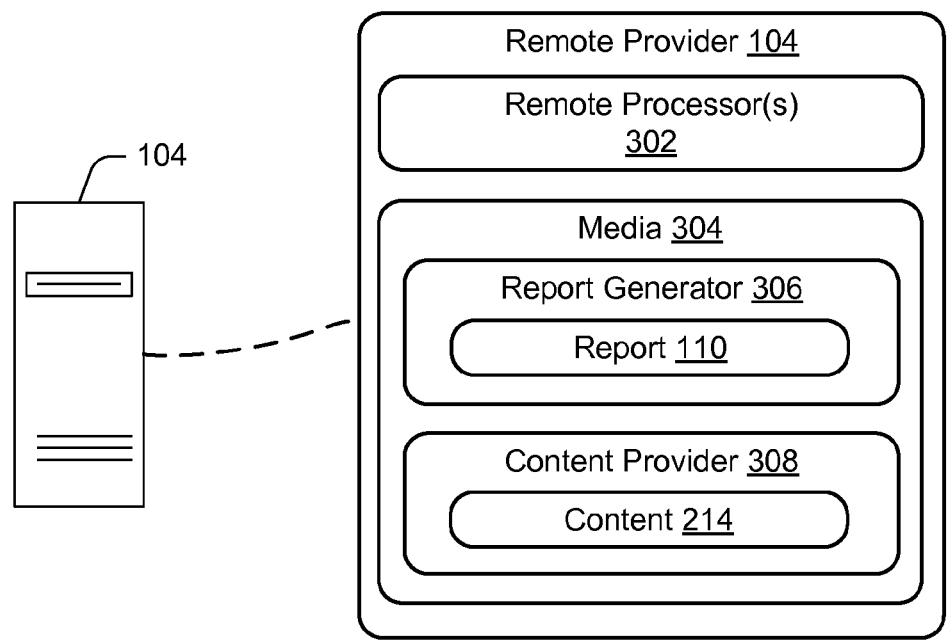
FIG. 3 illustrates an example embodiment of the remote provider of FIG. 1.

FIG. 3 illustrates example embodiments of remote provider 104. Remote provider 104 is shown as a singular entity for visual brevity, though multiple remote providers are also contemplated herein. Remote provider 104 includes or has to access to provider processor(s) 302 and provider computer-readable storage media 304 (media 304). Media 304 includes report generator 306 and content provider 308.

Report generator 306 is capable of providing one or more reports 110 to computing device 102, either directly or indirectly through report compiler 106. In some embodiments, reports 110 include information useful for indicating a change, presenting content associated with the change, or visiting the application (e.g., with universal resource locators (URLs)).

Report generator 306 may act responsive to reporter 210, such as a request from reporter 210 for reports 110, though report generator 306 may also act to periodically send, or consistently make available, new and/or interesting content or data as it become available. Report generator 306 may indicate what is new since a user last selected a particular application, though it may also simply provide reports 110, with which reporter 210 may instead determine what is or is not new.

Content provider 308 provides content, such as content 214 associated with application 212. Content provider 308 may act in conjunction with report generator 306, such as to provide content 214 to report generator 306, which report generator 306 then provides a portion of (or sometimes all of) in report 110.

Figure 4:
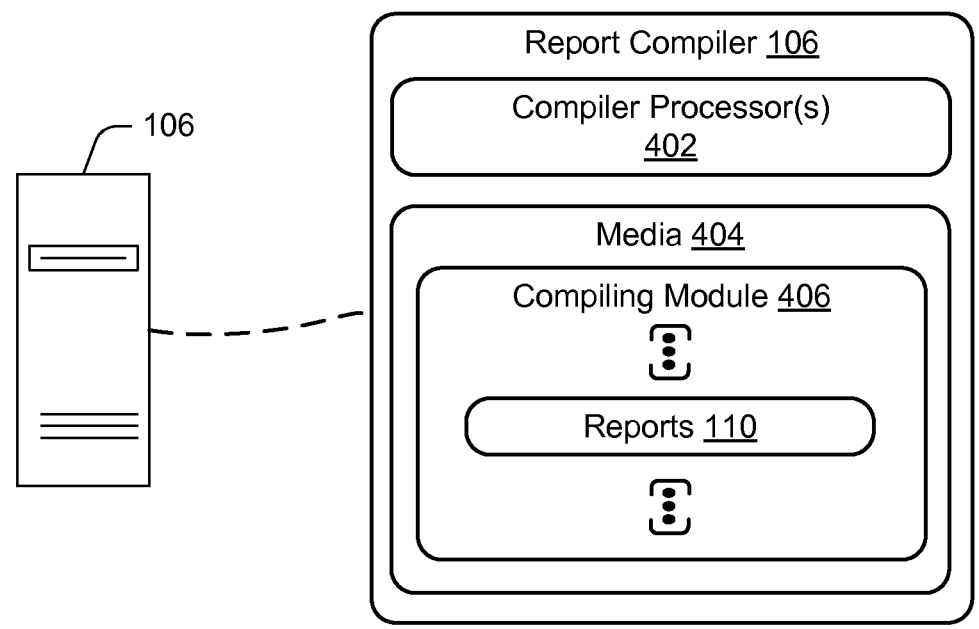
FIG. 4 illustrates an example embodiment of the report compiler of FIG. 1.

FIG. 4 illustrates an example embodiment of report compiler 106. Report compiler 106 is shown as a singular entity for visual brevity, though multiple compilers may also be used. Report compiler 106 includes or has to access to compiler processor(s) 402 and compiler computer-readable storage media 404 (media 404). Media 404 includes compiling module 406, which is capable of receiving and compiling reports 110 from one or more sources, such as report provider 104. Compiling module 406 may receive reports for later provision to computing device 102, such as periodically or when computing device 102 indicates that it is on. Compiling module 406 may determine which changes are new since a particular user last viewed content from an application and provide those of the reports 110 indicating these changes.

Ways in which entities of FIGS. 1-4 act and interact are set forth in greater detail below. The entities illustrated for computing device 102, remote provider 104, or report compiler 106, respectively, can be separate or integrated.

Example Methods

Figure 5:
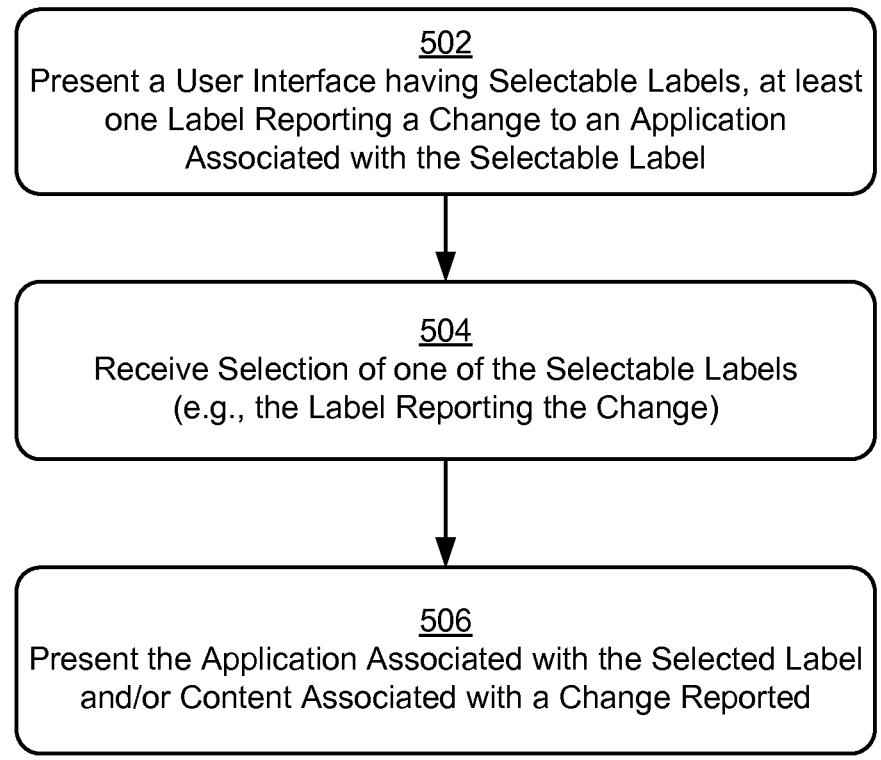
FIG. 5 illustrates an example method for application reporting in an application-selectable user interface.

FIG. 5 depicts a method 500 for application reporting in an application-selectable user interface. In portions of the following discussion reference may be made to environment 100 of FIG. 1 and as detailed in FIGS. 2-4, reference to which is made for example only.

Block 502 presents a user interface having multiple, selectable labels associated with multiple applications, respectively. One of the multiple selectable labels reports a change associated with the application to which the selectable label is associated, though multiple changes for multiple applications or the same application may also be reported. Reporting of one or more changes is not required (e.g., at some times none of the applications will have a change to report).

Figure 6:
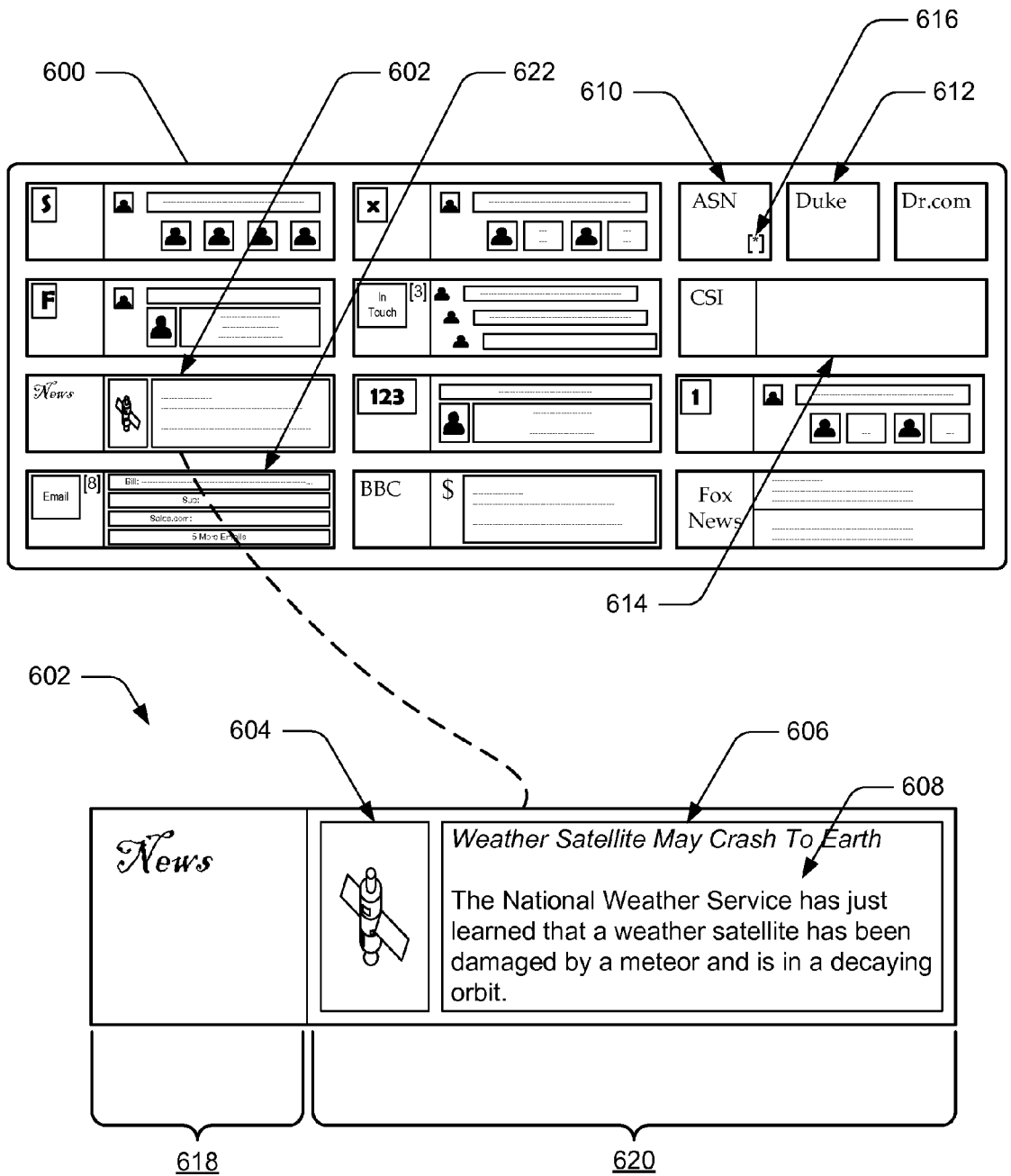
FIG. 6 illustrates an example user interface having fifteen selectable labels.

By way of example, consider a case where reporter 210 of FIG. 2 presents a user interface 600 shown in FIG. 6. This user interface 600 is but one of many types of user interfaces contemplated by user interface 220 of FIG. 2, including a user interface having a single label. User interface 600 includes fifteen selectable labels, twelve of them relatively large and three relatively small.

This example user interface 600 reports changes to eleven of the twelve larger labels and one of the three small labels, though any variation of such a presentation is contemplated, such as changes to all or none of the selectable labels. Note that these changes, even if all of these changes were already received at the time a user selects to view user interface 600, may be presented to each of the various labels and portions of the labels progressively. This progressive alteration of the labels can make user interface 600 look animated. Thus, the changes to the labels are not necessarily made all at once.

Further, in cases where multiple changes for an application are known, reporter 210 may present the newest of the changes or rotate through these changes. Reporter 210 may rotate through changes to maintain a "live" feel to user interface 600 or responsive to activity or inactivity with a label. Inactively with a label may indicate that the currently-indicated change is not of interest to a user. As another of the changes may be of more interest, the most-recent change may be rotated off of a label and an older (but still new) change rotated on to the label.

Consider first selectable label 602, which is shown expanded in FIG. 6. This selectable label 602 is associated with one of applications 212 of FIG. 2, namely a "News" application. As shown, selectable label 602 reports a change associated with this application 212 within selectable label 602, the change relative to a prior viewing, selection, or launching of this application 212 by a user associated with computing device 102.

Assume that a user viewed the News application at 9 am and, on viewing user interface 600, is presented with selectable label 602 reporting a change to the News application since 9 am (at 3 pm the same day, for example). Here the change is a new article concerning a weather satellite that has been damaged by a meteor and may crash to earth. Portions of content associated with the change (the change being the new article) are shown in selectable label 602. These portions each report the change by indicating that a new article is now available, here with an image 604 of a satellite, a title of the article at 606, and a first sentence of the article at 608.

Consider also three other example selectable labels, small selectable labels 610 and 612, and another of the large selectable labels 614. Small selectable label 610 reports a change to an application associated with this label, namely the "ASN" application. Label 610 reports a change with a change indicator 616 marked as "*", though this indicator 616 does not indicate how many changes or any content associated with that change. This abbreviated report on a change may be desirable when the application associated with the label is not generally important to the user, or changes are often of a similar type and thus presenting content of the change is not meaningful, or simply because the user desires it.

Small selectable label 612, on the other hand, does not report any changes. This non-reporting provides the user with valuable information, namely that the user need not select label 612 to see something new for the "Duke" application, as no changes exist since the user last visited the application.

Large selectable label 614 also does not report any changes, thus also providing the user with valuable information concerning changes (or lack thereof) for the "CSI" application.

As described, reporter 210 enables selection of applications and reports changes to those applications. Reporter 210 may also enable different selections through different areas of a label. Consider again label 602. Here reporter 210 enables selection through application-identifying area 618 and reporting area 620. This application-identifying area 618 shows an application-selected identifier for the "News" application at 622, namely "News" in a particular font and color (color not shown). Reporter 210 enables a selection made to this application-identifying area 618 to present the "News" application at a default or prior-viewed setting, such as a home page or a last-viewed page of content. Thus, on selection of application-identifying area 618, reporter 210 may refrain from presenting content associated with the reported change.

Reporter 210 enables a selection made to reporting area 620 to present the "News" application with the change, such as presenting content associated with the change, here opening a webpage at a universal resource locator (URL) associated with the content change. In such a case, reporter 210 presents the News application having the article that was shown in part in reporting area 620.

Some labels may indicate multiple changes, such as reporting (with some associated content) the two newest entries to a social-networking website or emails received since the user last viewed an email application. In such a case, reporter 210 enables selection to each section reporting the change to present the associated application with content associated with that change, such as to open one of multiple emails reported.

By way of review, reporter 210 can report changes to various applications responsive to received reports, such as reports 110 of FIG. 1, which can be received one-at-a-time, after compiling into batches, and/or from various sources. These reports 110 can be received or retrieved periodically, on selecting to display user interface 220, and/or in real time. User interface 600, for example, may alter selectable labels as a user views it due to reports coming in and being reported. Thus, reporter 210 may act to actively update reporting for applications in a user interface through which a user can select applications.

Reporter 210 may determine which reports 110 indicate changes to an application since the user last viewed or interacted with the application, though in some other cases an entity providing the report instead determines this (e.g., remote provider 104, report compiler 106, or application 212).

Further, in some embodiments reporter 210 receives reports along with an indication of a presentation format in which the reports are preferred to be presented. This presentation format preference may be selected by an entity associated with the respective application, such as a social-networking server associated with a social-networking application, or based on user preference. Various examples of presentation formats 222 are illustrated in FIG. 6. Large selectable label 602, for example, presents only a most-recent change along with three portions of content for that change. Small selectable label 610, conversely, presents only a change indicator 616 with no content.

Returning to method 500, block 504 receives selection of one of the multiple, selectable labels, such as a label reporting a change. The selection received can be to various areas (or sections of areas) of a selectable label, responsive to which reporter 210 presents the application associated with the selectable label, though how presented may vary based on which area is selected. As noted, the application associated with a selectable label may or may not be executing. Consider, for example, large selectable label 602 and another large selectable label 622. Label 602 is associated with a "News" application of applications 212 of FIG. 2. Label 622 is associated with an email application of applications 212. For this example, assume that the News application is not executing and that reports are received from a remote entity associated with the News application, such as remote provider 104. Assume also that the email application is local to computing device 102 and is executing. Reports 110 for the email application are received by reporter 210 direct from the email application.

Continuing the ongoing embodiment, assume that reporter 210 receives a selection to application-identifying area 618, such as through a mouse selector or a gesture via a touchscreen displaying user interface 600, such as one of displays 206 shown in FIG. 2.

Block 506 presents the application associated with the selected label and/or content associated with a change reported in the selected label. When block 506 presents the application, it does so in a manner in which the application may be interacted with, e.g., in an immersive or windows-based environment. This presentation may also or instead present content associated with a reported change but not necessarily the application itself as described in further detail below.

This presentation may include launching the application and then presenting it, such as in a window via windows-based environment module 216 or in an immersive environment via immersive environment module 218, both of FIG. 2. If the application is already executing, a launch is not needed. Responsive to receiving a selection of a selected label, the techniques may provide a visual indication of the selection, such as to animate the selected portion of the label. By so doing, the techniques reinforce the type of selection.

Concluding the ongoing embodiment, reporter 210 presents the News application in response to selection of selectable label 602, here to application-identifying area 618. This presentation includes launching the News application, as it was not executing at selection. As noted, reporter 210 may present and/or launch an application through an instruction to another entity, such as the above-mentioned modules 216 or 218.

Figure 7:
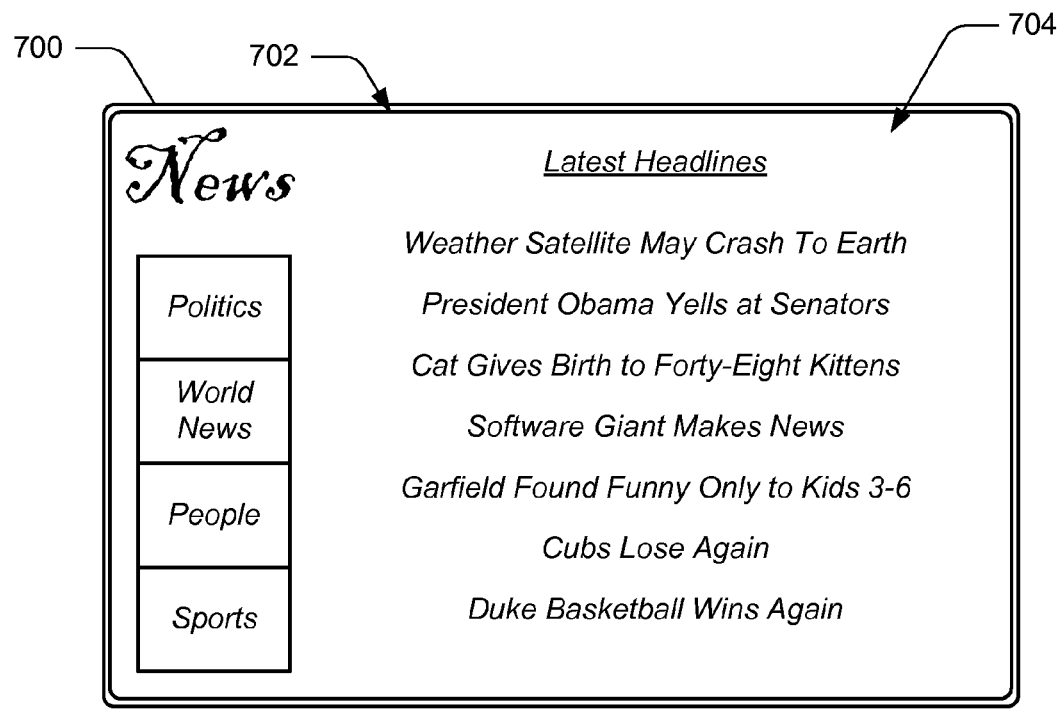
FIG. 7 illustrates an example presentation of a selected application in an immersive environment.

FIG. 7 illustrates an example presentation of the News application in an immersive environment 700. Because application-identifying area 618 was selected, a default presentation (here a home page) for the News application is shown. This home page is shown at 702 and includes various headlines 704 for selection, one of which is the most-recent article also shown at 606 in FIG. 6. While this title is shown, the home page is presented rather than a webpage having a full representation of the content or otherwise devoted to the article, which would otherwise be presented had the selection been made to reporting area 620.

Figure 8:
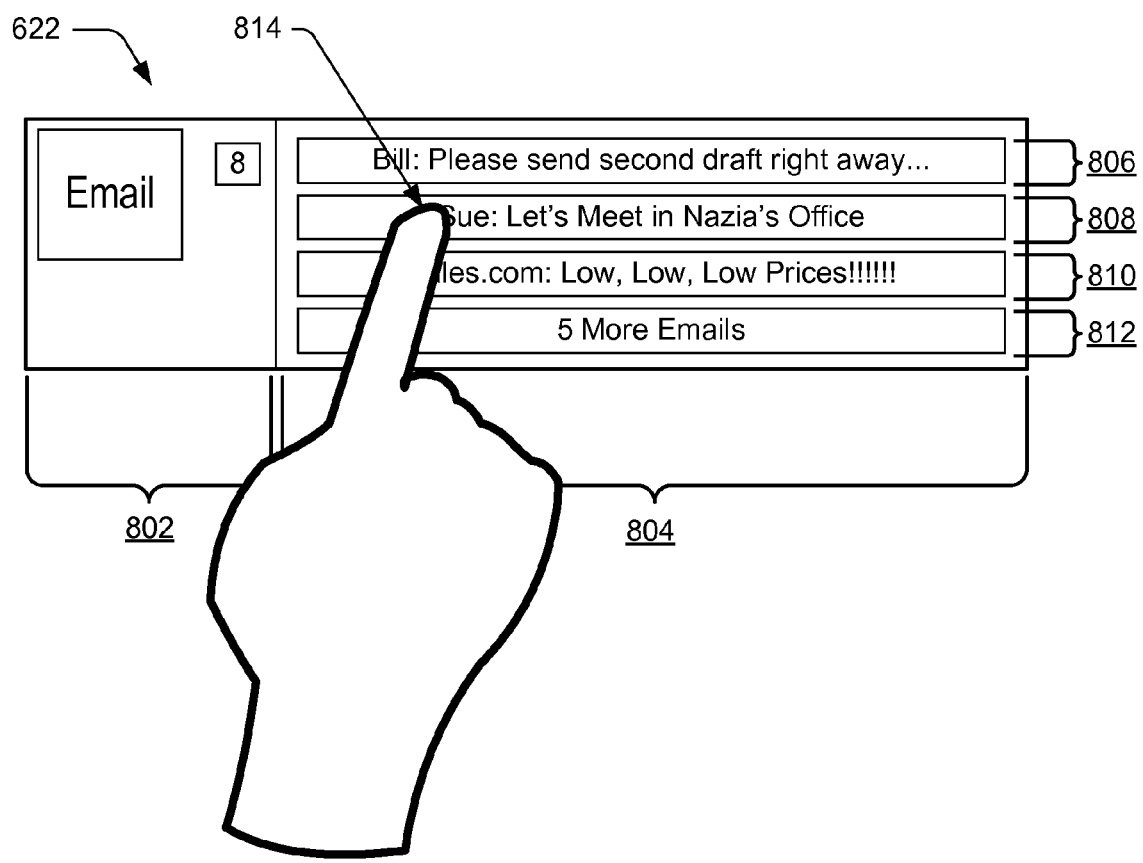
FIG. 8 illustrates a selectable label of FIG. 6 along with selectable sections reporting changes.

By way of another example, consider a case where selection is received at block 504 through large selectable label 622 of FIG. 6, which is expanded for clarity in FIG. 8. Label 622 is shown having an application-identifying area 802 and a reporting area 804. Reporting area 804 includes four selectable sections reporting changes, sections 806, 808, 810, and 812. Each of selectable sections 806, 808, and 810 reports content associated with a change, here each a sender and a subject line of an email. Section 812 reports five changes, here that five other emails have also been received since the email application was last viewed by the user. In this example, selection is received to section 808 through a gesture 814 made to a touch screen.

Figure 9:
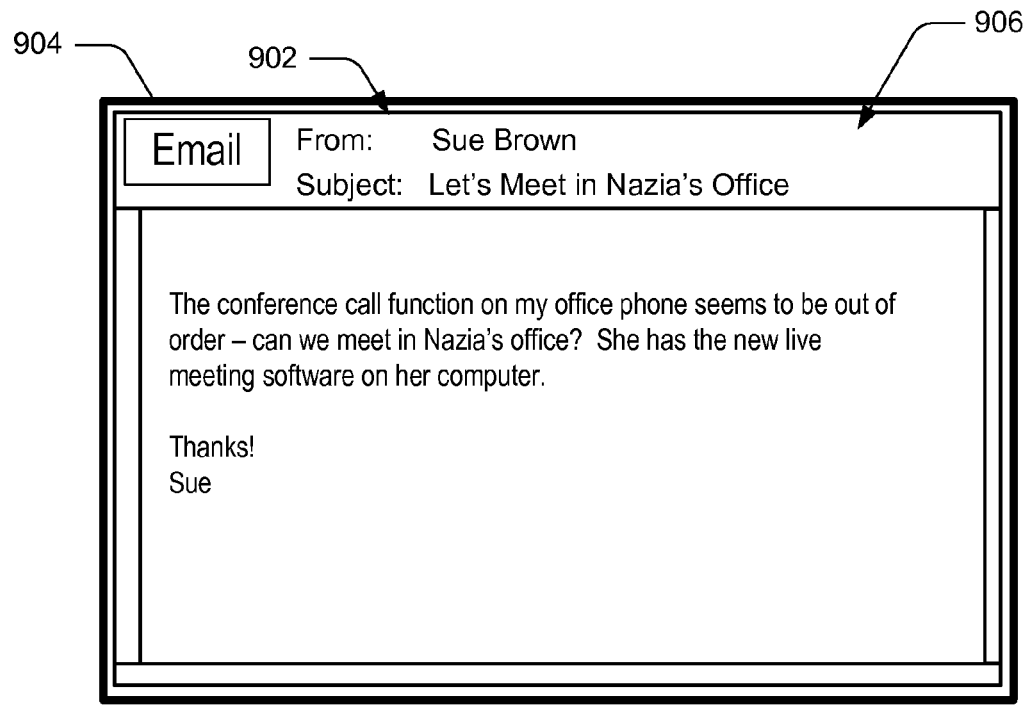
FIG. 9 illustrates an example presentation of a selected application in a windows-based environment.

Reporter 210, at block 506, presents the selected email application and content of the email associated with the selection. Here the application is currently executing, therefore reporter 210 does not launch the email application. Presentation of the email application and the change reported, rather than a home or default presentation, is shown in FIG. 9 at 902 in a window 904. Note that reporter 210 may cause this presentation in a window superimposed over the application-selectable user interface or hide the user interface and present the window in a different environment. Here reporter 210 hides the user interface and presents the email application at 902 showing content associated with the selection received at 906.

In still another example, consider again FIG. 8. In some cases selection made to a selectable label indicating a change may present content associated with that change. This presentation may be commensurate with presentation of the application as described above. In some other cases, the content is shown without hiding the user interface and/or without presenting the application in a conventional manner. Assume, for the selection 814 of FIG. 8, that reporter 210, rather than presenting the email application and the content, instead presents content associated with the change on its own. In this case, more or all of the content associated with that change is shown. Assume, for example, that most or all of the content associated with a new email from Sue was received in one of the reports 110. Reporter 210 may present the rest of this content, such as within or superimposed over user interface 600.

Figure 10:
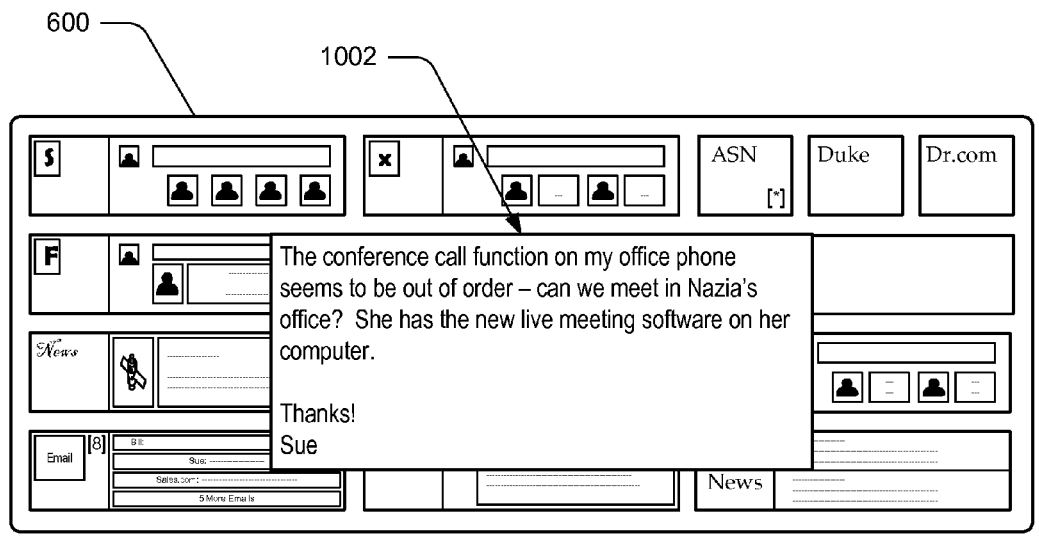
FIG. 10 illustrates a pop-up window having content associated with a change to an application.

An example of this is shown in FIG. 10, which shows a pop-up window 1002 having more content associated with a reported change. This may also be used to expand the "5 More Emails" shown at section 812 in FIG. 8 to show, for example, the sender and subject lines for those emails. This may be used to show some content associated with a change for which no content is currently shown, such as change indicator 616 of FIG. 6. This alternative operation of block 506 permits a user to select to see more content associated with a change, which in some cases is enough for the user to forgo selecting the application generally.

The preceding discussion describes methods for application reporting in an application-selectable user interface. These methods are shown as sets of blocks that specify operations performed but are not necessarily limited to the order shown for performing the operations by the respective blocks.

Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computing devices.

These techniques may be embodied on one or more of the entities shown in environment 100 of FIG. 1 (and as detailed in FIGS. 2-4) and/or example device 1100 described below, which may be further divided, combined, and so on. Thus, environment 100 and/or device 1100 illustrate some of many possible systems or apparatuses capable of employing the described techniques. The entities of environment 100 and/or device 1100 generally represent software, firmware, hardware, whole devices or networks, or a combination thereof. In the case of a software implementation, for instance, the entities (e.g., reporter 210 of FIG. 2, report generator 306 of FIG. 3, and compiling module 406 of FIG. 4) represent program code that performs specified tasks when executed on a processor (e.g., processor(s) 202, 302, and 402, respectively). The program code can be stored in one or more computer-readable memory devices, such as computer-readable storage media 204, 304, or 404 or computer-readable media 1114 of FIG. 11. The features and techniques described herein are platform-independent, meaning that they may be implemented on a variety of commercial computing platforms having a variety of processors.

Example Apparatus

Figure 11:
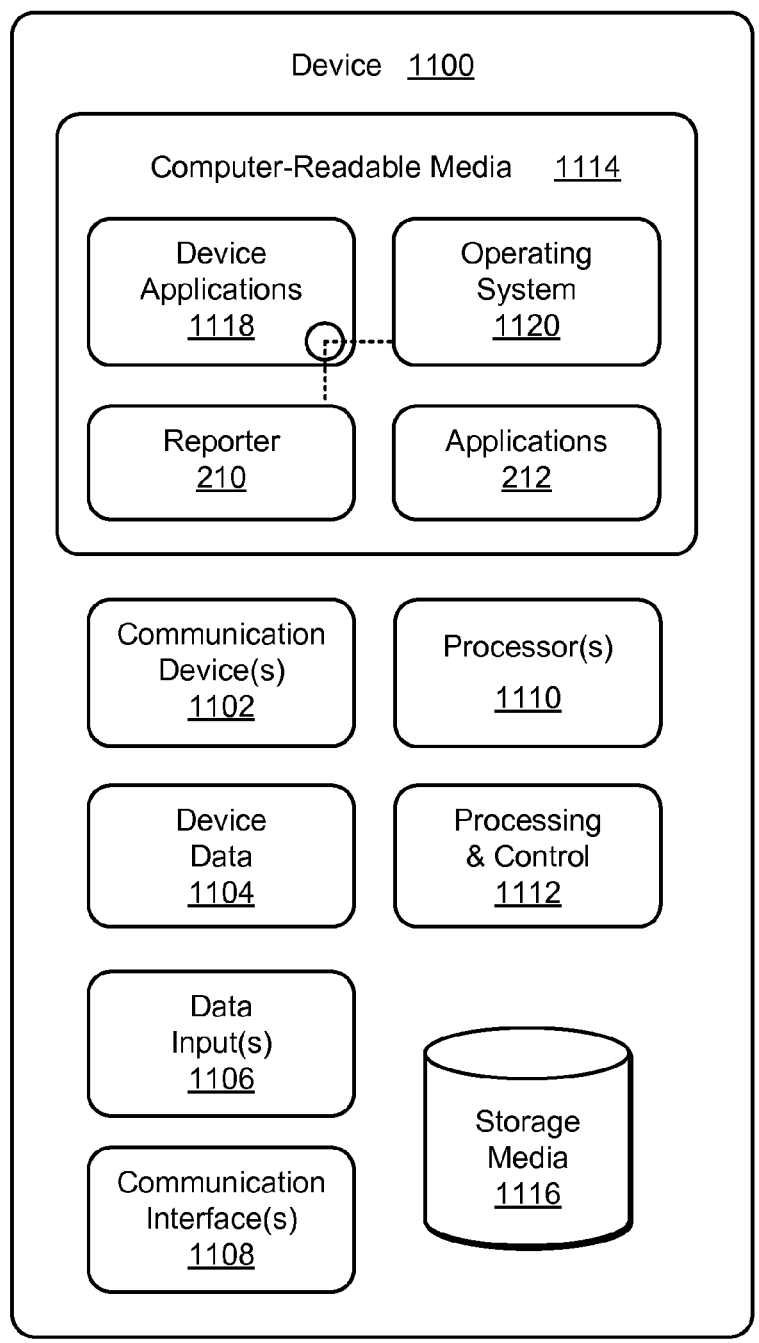
FIG. 11 illustrates an example device in which techniques for application reporting in an application-selectable user interface can be implemented.

FIG. 11 illustrates an apparatus having various components, here as part of an example device 1100, which can be implemented as any type of client, server, and/or computing device as described with reference to the previous FIGS. 1-10 to implement techniques for application reporting in an application-selectable user interface. In embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). The device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. The communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to enable application reporting in an application-selectable interface. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable storage media 1114 provides data storage mechanisms to store the device data 1104, as well as various device applications 1118 and any other types of information and/or data related to operational aspects of device 1100. For example, an operating system 1120 can be maintained as a computer application with the computer-readable storage media 1114 and executed on processors 1110. The device applications 1118 may include a device manager, such as any form of a control application, software application, signal-processing and control module, code that is native to a particular device, a hardware abstraction layer for a particular device, and so on.

The device applications 1118 also include any system components or modules to implement techniques for application reporting in an application-selectable user interface. In this example, the device applications 1118 can include reporter 210 and applications 212.

CONCLUSION

Although embodiments of techniques and apparatuses for application reporting in an application-selectable user interface have been described in language specific to features and/or methods, it is to be understood that the subject of the appended claims is not necessarily limited to the specific features or methods described. Rather, the specific features and methods are disclosed as example implementations for application reporting in an application-selectable user interface.

What is claimed is:

1. A computing device comprising:
one or more computer processors; and
one or more computer-readable storage media having instructions stored thereon that, responsive to execution by the one or more computer processors, perform operations comprising:
presenting a user interface having multiple selectable labels associated with multiple applications, respectively, at least one of the multiple selectable labels:
reporting a first change in a first area of the selectable label, the first change associated with first content of the application to which the selectable label is associated; and
reporting a second change in a second area of the selectable label, the second change associated with second content of the application to which the selectable label is associated;
receiving selection of the selectable label through the first area or the second area; and
responsive to selection of the selected label, presenting, within the selected label, the first content responsive to selection of the first area or the second content responsive to selection of the second area.

2. A computing device as described in claim 1, wherein presenting, within the selected label, the first content or the second content presents the first content or the second content within the first area or the second area, respectively.

3. A computing device as described in claim 1, wherein presenting, within the selected label, the first content or the second content presents the first content or the second content within a reporting area having both the first area and the second area.

4. A computing device as described in claim 1, wherein the operations further comprise receiving selection of the first content or the second content presented within the selected label and, responsive to the selection of the first content or the second content, presenting more content associated with the selected first content or the selected second content.

5. A computing device as described in claim 4, wherein presenting more content associated with the selected first content or the selected second content presents the more content also within the selected label.

6. A computing device as described in claim 4, wherein presenting more content associated with the selected first content or the selected second content presents a rest of the content associated with the first change or the second change.

7. A computing device as described in claim 1, wherein another of the multiple selectable labels includes an area that reports a change and another area that does not report the change and further comprising, on selection of the other area that does not report the change, presenting the other selected application in a default presentation of the other selected application that does not present content associated with the change.

8. A computing device as described in claim 1, wherein reporting the first or second change presents a portion of the first or second content associated with the first or second change, respectively, within the selectable label.

9. A computing device as described in claim 1, wherein the operations further comprise:
receiving a report indicating a new change, the new change associated with one of the multiple applications; and
altering one of the multiple, selectable labels to report the new change.

10. A computing device as described in claim 9, wherein the new change is associated with a different one of the multiple applications than the application associated with the selected label.

11. A computing device as described in claim 1, wherein the application associated with the selected label is executing prior to reporting the first or second change and further comprising receiving a report having the first or second change from the application associated with the selected label.

12. A computing device as described in claim 1, wherein the application associated with the selected label is not executing prior to reporting the first or second change and further comprising receiving a report having the first or second change from a remote entity associated with the application associated with the selected label.

13. A computing device as described in claim 1, wherein the first or second change is a change to content of the application associated with the selected label relative to a most-recent prior presentation of the application associated with the selected label.

14. A computing device as described in claim 1, wherein the application associated with the selected label, when selected, is not executing, and wherein presenting the first content or the second content includes launching the application.

15. A computing device as described in claim 1, wherein the application associated with the selected label, when selected, is executing, and wherein presenting the first content or the second content is performed with the first content or the second content received from the application.

16. A computing device as described in claim 1, wherein the first content or the second content is received in a report associated with, but not generated by, the application.

17. A computing device as described in claim 1, wherein receiving selection of the selectable label through the first area or the second area receives the selection of a change indicator within the first area or the second area, the change indicator associated with the first change or the second change.

18. A computing device as described in claim 4, wherein presenting more content associated with the selected first content or the selected second content presents a rest of the first or second content associated with the first change or the second change, respectively, within or superimposed over the user interface.

19. A computing device as described in claim 1, wherein the at least one of the multiple selectable labels reports a status change in a third area of the selectable label.

20. A computing device as described in claim 19, wherein the status change is a software update or expiration of the application.

* * * * *